(12) United States Patent
Grieves et al.

(10) Patent No.: US 11,430,414 B2
(45) Date of Patent: Aug. 30, 2022

(54) EYE GAZE CONTROL OF MAGNIFICATION USER INTERFACE

(71) Applicant: Microsoft Technology Licensing, LLC

(72) Inventors: Jason A. Grieves, Redmond, WA (US); Eric N. Badger, Coeur D Alene, ID (US); Grant M. Wynn, Redmond, WA (US); Paul J. Olczak, Seattle, WA (US); Christian Klein, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/656,438

(22) Filed: Oct. 17, 2019

(65) Prior Publication Data

US 2021/0118410 A1 Apr. 22, 2021

(51) Int. Cl.
*G09G 5/373* (2006.01)
*G06T 7/55* (2017.01)
(Continued)

(52) U.S. Cl.
CPC .............. *G09G 5/373* (2013.01); *G06F 3/012* (2013.01); *G06F 3/013* (2013.01); *G06T 7/20* (2013.01);
(Continued)

(58) Field of Classification Search
CPC .............. G09G 5/373; G09G 2340/045; G09G 2354/00; G06F 3/013; G06F 3/012;
(Continued)

(56) References Cited

U.S. PATENT DOCUMENTS 6,489,951 B1 12/2002 Wong et al.
8,001,483 B2 8/2011 De et al.
(Continued)

FOREIGN PATENT DOCUMENTS

| CN | 111355841 A | 6/2020 |
|---|---|---|
| JP | 2014192781 A | 10/2014 |
| WO | 2019050508 A1 | 3/2019 |

OTHER PUBLICATIONS

"Non-Final Office Action Issued in U.S. Appl. No. 16/656,450", dated Aug. 20, 2020, 17 Pages.
(Continued)

*Primary Examiner* — Grace Q Li
(74) *Attorney, Agent, or Firm* — NovoTechIP International PLLC

(57) ABSTRACT

Techniques for providing adaptive assistive technology for assisting users with visual impairment can be used on a computing device. These techniques include displaying content to a user, capturing a series of images or video of the user using a camera, analyzing the series of images or video to determine whether the user is exhibiting behavior or characteristics indicative of visual impairment, and rendering a magnification user interface on the display configured to magnify at least a portion of the content of the display based on a determination that the user is exhibiting behavior or characteristics indicative of visual impairment. The magnification user interface may be controlled based on head and/or eye movements of the user of the computing device.

17 Claims, 15 Drawing Sheets

(51) Int. Cl.
*G06F 3/01* (2006.01)
*G06T 7/20* (2017.01)
*G06V 40/18* (2022.01)
*G06V 40/20* (2022.01)

(52) U.S. Cl.
CPC ............... *G06T 7/55* (2017.01); *G06V 40/18* (2022.01); *G06V 40/20* (2022.01); *G06F 2203/011* (2013.01); *G06T 2207/30201* (2013.01); *G09G 2340/045* (2013.01); *G09G 2354/00* (2013.01)

(58) Field of Classification Search
CPC ....... G06F 2203/011; G06T 7/20; G06T 7/55; G06T 2207/30201; G06K 9/00335; G06K 9/00597
See application file for complete search history.

(56) References Cited

U.S. PATENT DOCUMENTS

| | | |
|---|---|---|
| 8,013,837 B1 | 9/2011 | Schroeder |
| 8,494,507 B1 | 7/2013 | Tedesco et al. |
| 8,630,633 B1 | 1/2014 | Tedesco et al. |
| 8,913,005 B2 | 12/2014 | Uppuluri et al. |
| 9,377,922 B2 | 6/2016 | Work |
| 9,483,573 B2 | 11/2016 | Bellamy et al. |
| 9,706,304 B1 | 7/2017 | Kelso et al. |
| 10,265,218 B2 | 4/2019 | Rollend et al. |
| 10,394,579 B2 | 8/2019 | Nandakumar et al. |
| 10,514,888 B1 | 12/2019 | Rodgers |
| 10,725,647 B2 | 7/2020 | Klein et al. |
| 10,740,118 B1 | 8/2020 | Pottjegort et al. |
| 10,891,688 B1 | 1/2021 | Clausen et al. |
| 2002/0183648 A1 | 12/2002 | Hou |
| 2006/0139312 A1 | 6/2006 | Sinclair et al. |
| 2008/0005679 A1 | 1/2008 | Rimas-ribikauskas et al. |
| 2008/0007521 A1 | 1/2008 | Kuijpers et al. |
| 2008/0051946 A1* | 2/2008 | Breed ................ G02B 27/01 701/1 |
| 2009/0268919 A1 | 10/2009 | Arora |
| 2010/0097523 A1 | 4/2010 | Shin |
| 2010/0180238 A1 | 7/2010 | Lanfermann et al. |
| 2010/0205667 A1 | 8/2010 | Anderson et al. |
| 2010/0322446 A1 | 12/2010 | Strahl |
| 2012/0033825 A1 | 2/2012 | Zinn et al. |
| 2012/0081560 A1* | 4/2012 | Park ................ H04N 5/23219 348/208.12 |
| 2013/0063494 A1 | 3/2013 | Kirschner et al. |
| 2013/0250086 A1 | 9/2013 | Mar et al. |
| 2014/0071342 A1 | 3/2014 | Winograd et al. |
| 2014/0181673 A1 | 6/2014 | Work |
| 2014/0309806 A1 | 10/2014 | Ricci |
| 2014/0344839 A1 | 11/2014 | Woods et al. |
| 2014/0356848 A1 | 12/2014 | Peterson |
| 2015/0062140 A1* | 3/2015 | Levantovsky ............ G09G 5/37 345/581 |
| 2015/0120293 A1 | 4/2015 | Wohlert et al. |
| 2015/0212677 A1 | 7/2015 | Dunne et al. |
| 2015/0287043 A1 | 10/2015 | Michaelis et al. |
| 2015/0346813 A1* | 12/2015 | Vargas ................ G06F 3/012 345/8 |
| 2016/0011657 A1 | 1/2016 | Estacio |
| 2016/0034050 A1* | 2/2016 | Ady ................ G06F 3/011 345/619 |
| 2016/0166204 A1 | 6/2016 | Stevens et al. |
| 2016/0195986 A1 | 7/2016 | Kwon et al. |
| 2017/0005634 A1 | 1/2017 | Raz et al. |
| 2017/0154512 A1 | 6/2017 | Lection et al. |
| 2017/0269816 A1 | 9/2017 | Bradley et al. |
| 2018/0075659 A1 | 3/2018 | Browy et al. |
| 2018/0114566 A1 | 4/2018 | Aoyama et al. |
| 2018/0376212 A1* | 12/2018 | Candelore .......... H04N 21/4728 |
| 2019/0130761 A1* | 5/2019 | Rau ................ B60W 40/09 |
| 2019/0180469 A1 | 6/2019 | Gu et al. |
| 2019/0317594 A1* | 10/2019 | Stent ................ G06K 9/4671 |
| 2020/0105291 A1 | 4/2020 | Sheaffer et al. |
| 2020/0110577 A1 | 4/2020 | Rodgers |
| 2020/0152328 A1* | 5/2020 | Bender ................ G06N 7/005 |
| 2020/0160748 A1 | 5/2020 | Hans et al. |
| 2020/0312268 A1* | 10/2020 | Nicholson .......... G06K 9/00597 |
| 2020/0356656 A1 | 11/2020 | Chhabra et al. |
| 2021/0015404 A1 | 1/2021 | Arar et al. |
| 2021/0073523 A1 | 3/2021 | Reynolds et al. |
| 2021/0117048 A1 | 4/2021 | Grieves et al. |

OTHER PUBLICATIONS

"Final Office Action Issued in U.S. Appl. No. 16/656,450", dated Mar. 11, 2021, 20 Pages.

"International Search Report & Written Opinion Issued in PCT Application No. PCT/US20/054652", dated Mar. 9, 2021, 17 Pages.

"International Search Report & Written Opinion Issued in PCT Application No. PCT/US20/054655", dated Mar. 16, 2021, 17 Pages.

"Non Final Office Action Issued in U.S. Appl. No. 16/656,450", dated Aug. 23, 2021, 23 Pages.

"Final Office Action Issued in U.S. Appl. No. 16/656,450", dated Feb. 25, 2022, 21 Pages.

* cited by examiner

EYE GAZE CONTROL OF MAGNIFICATION USER INTERFACE

BACKGROUND

Many computer users experience some level of visual impairment that can make using a graphical user interface of a computing device difficult. Many users also experience auditory impairments or mobility impairments that can make performing other tasks on a computing device difficult. Some computer systems include a magnification user interface that enables a user to magnify the content of at least a portion of the display of the device. Closed captioning and other assistive technologies may assist with auditory and mobility impairments. However, the existing solutions are typically controlled by mouse, keyboard, and/or touch inputs to the computing device, which can be difficult to control for users suffering an impairment. There are significant areas for new and approved mechanisms for detecting the need for such assistive technologies and for accessing and controlling such assistive technologies.

SUMMARY

A computing device according to one aspect of the invention includes a processor and a computer-readable medium storing executable instructions. The executable instructions are for causing the processor to perform operations that include displaying content on a display of the computing device; capturing a series of images of user of the computing device using a camera associated with the computing device; analyzing the series of images to determine whether the user is exhibiting behavior or characteristics indicative of visual impairment; and rendering a magnification user interface on the display configured to magnify at least a portion of the content of the display based on a determination that the user is exhibiting behavior or characteristics indicative of visual impairment.

A method for controlling a user interface of a computing device according to a second aspect of the invention includes displaying content on a display of the computing device; capturing a series of images of user of the computing device using a camera associated with the computing device; analyzing the series of images to determine whether the user is exhibiting behavior or characteristics indicative of visual impairment; and rendering a magnification user interface on the display configured to magnify at least a portion of the content of the display based on a determination that the user is exhibiting behavior or characteristics indicative of visual impairment.

A memory device storing instruction that, when executed on a processor of a computing device, according to a third aspect of the invention include instructions that cause the computing device to render a magnification user interface by displaying content on a display of the computing device; capturing a series of images of user of the computing device using a camera associated with the computing device; analyzing the series of images to determine whether the user is exhibiting behavior or characteristics indicative of visual impairment; and rendering a magnification user interface on the display configured to magnify at least a portion of the content of the display based on a determination that the user is exhibiting behavior or characteristics indicative of visual impairment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1B:
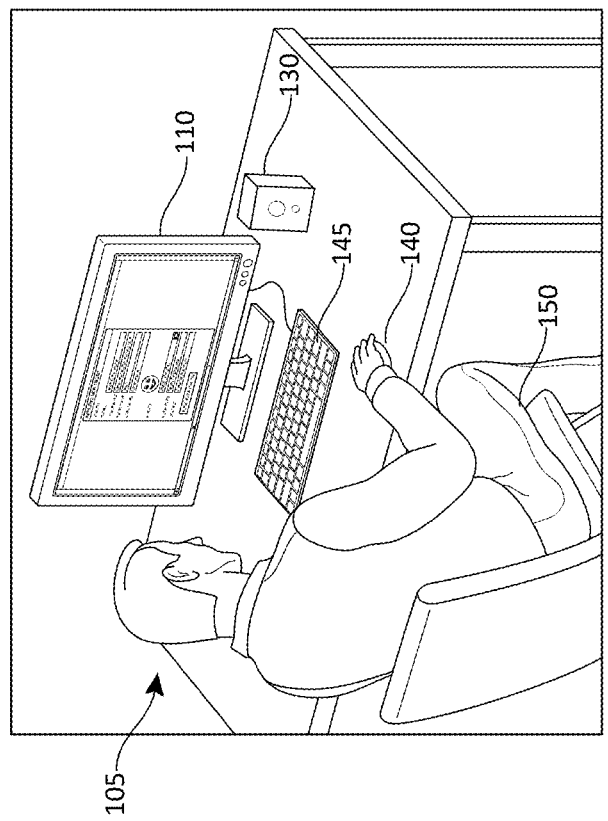
FIGS. 1A, 1B, 1C, and 1D illustrate an example of a computing device on which the magnification techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

In conventional computing systems, assistive technologies may be available to a user, but the user may not be aware of these assistive technologies. Typically, a user facing visual, auditory, or mobility impairment must be trained by an occupational therapist (OT), a Teacher of the Visually Impaired (TVI), or other person knowledgeable about these technologies. However, many users do not have access to such training. Many users miss out on the opportunity to use these assistive technologies unless they are aware of the existence of these assistive technologies and are comfortable enough with computer technology to experiment with configuring the assistive technologies on their own.

The techniques disclosed herein provide adaptive assistive technologies that can recognize that a user may be experiencing visual impairment, auditory impairment, mobility impairment, cognitive impairment, and/or other impairment that may impact the user's ability to effectively use a computing device. As will be seen in the examples that follow, the computing device may have many different form factors each providing unique challenges for users of these devices. The computing device may also be a personal computing device, a work computing device, or a publicly available computing device. The personal and work computing devices may be personalized for use for a particular user. The publicly available computing devices may provide assistive technologies that can assist a user while the user is utilizing the publicly available computing device but may revert back to a default configuration once the user is done using the computing device.

One aspect of the adaptive assistive technologies disclosed herein is an improved magnification user interface (also referred to herein as a "magnifier") to assist users who may have visual impairments. Another aspect of the adaptive assistive technologies disclosed herein is adaptive assistive technology unit (also referred to herein as an "AATU") that is configured to detect that a user may have visual impairment, auditory impairment, mobility impairments, and/or other impairments. The AATU provides a means for identifying various adaptive technologies provided by the computing device that may assist a user experiencing these issues. The AATU may automatically enable the assistive technologies to adapt the computing device to the user's need and/or present the available assistive technologies to the user and walk the user through the process of setting up these technologies. The examples that follow illustrate these concepts.

The computing device used to implement the magnifier and the AATU may be a desktop computer system, a tablet computing device, a laptop, or a mobile phone. These techniques may also be used with other types of computing devices that utilize a display, such as a kiosk, an automated teller machine (ATM) (also referred to as an Automated Bank Machine, a cashpoint, or cash machine), and other types of computing devices that include a display on which a user may benefit from having the content displayed on the display magnified.

The improved magnifier provides significant improvements in usability over conventional magnifier user interfaces. One signification improvement is that the improved magnifier may be automatically rendered on the display of the computing device based on user proximity to the display of the computing device. Leaning toward the display of the computing device is a common response by users having difficulty viewing the content on the display. The magnifier may recognize this behavior as a trigger to launch the magnifier to assist the user in viewing the content on the display. This provides a significant improvement over conventional magnifier solutions, which are typically launched by a combination of keyboard inputs or by searching for the magnifier interface in a series of menu and/or configuration settings. Users who may have visual impairments that would benefit from the magnifier may not be aware of the availability of the magnifier on the computing device. Furthermore, the users may not be comfortable enough using a computing device to find the appropriate menu and/or configuration settings to launch the magnifier. Launching the magnifier automatically based on user proximity solves at least these problems by automatically presenting the magnifier to a user.

The techniques disclosed herein can also use head and/or eye tracking as a means for controlling the magnifier. Head and/or eye tracking provide a natural user interface for controlling the magnifier because the user can simply look at what they want to have magnified. The head and/or eye tracking data can be used to control a position of the magnifier on the display of a computing device in real time. The conventional magnifier controls typically require the user to control the placement of the magnifier using either a series of keyboard commands, a series of mouse inputs, or touch inputs. Both of these control mechanisms may be physically taxing on the user and time consuming. Using head and/or eye tracking provides a significantly improved means of controlling the magnifier in which the user may simply look at the content that they want to have magnified rather than struggling with keyboard and/or mouse inputs.

User proximity to the display may be used to control a zoom level applied by the magnifier. As indicated above, the magnifier may be launched based on user proximity to the display of the computing device. User proximity to the device may also be used to control the magnification level applied by the magnifier. In some implementations, the magnifier may increase the magnification in response to the user getting closer to the display of the computing device and decrease the magnification in response to the user moving farther away from the display. In some implementations, the zoom level may be held at a constant level if the user moves away from the display in response to the magnifier increasing the magnification level applied. The zoom level may alternatively be increased as the user moves away from the display of the computing device in response to the magnifier increasing the magnification level applied. The zoom level may be increased by an amount proportionate to how far the user moves away from the display in response to the magnification level having been increased. In some implementations, the zoom level may be controlled by a head and/or eye gesture as will be discussed in greater detail in the examples which follow. In such implementations, user proximity to the display may be used to trigger the launch of the magnifier, while head and/or eye gestures may be used to control the zoom level applied by the magnifier and/or other operating parameters of the magnifier. In yet other implementations, a combination of user proximity and head and/or eye gestures may be used to control the zoom level applied by the magnifier. User proximity, with or without head and/or eye gestures, provides an improved means for controlling the zoom level on the magnifier by performing a simple gesture or gestures that does not require the user to enter complex keyboard and/or mouse inputs. Furthermore, the magnifier may be configured to automatically close in response to the user moving more than a predetermined distance from the display.

Figure 1A:
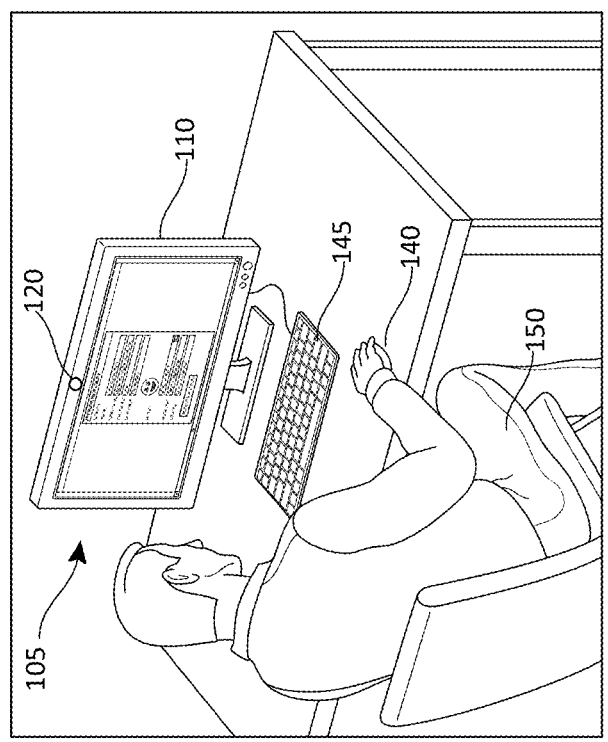

FIG. 1A is a diagram illustrating an example of one possible configuration of a computing device 105 that may be used to implement the techniques disclosed herein. The example computing device 105 includes a display 110, a keyboard 145, a mouse 140. The display includes a camera 120. In this example implementation of the computing device 105, the camera 120 is integrated with the display 110. However, as illustrated in FIG. 1B, the computing device 120 may be associated with a camera 130 that is a separate or standalone camera that is configured to communicate with the computing device 105 via a wired or wireless connection. In some implementations, the computing device 105 may include multiple cameras integrated with or associated with the computing device 105.

Figure 1D:
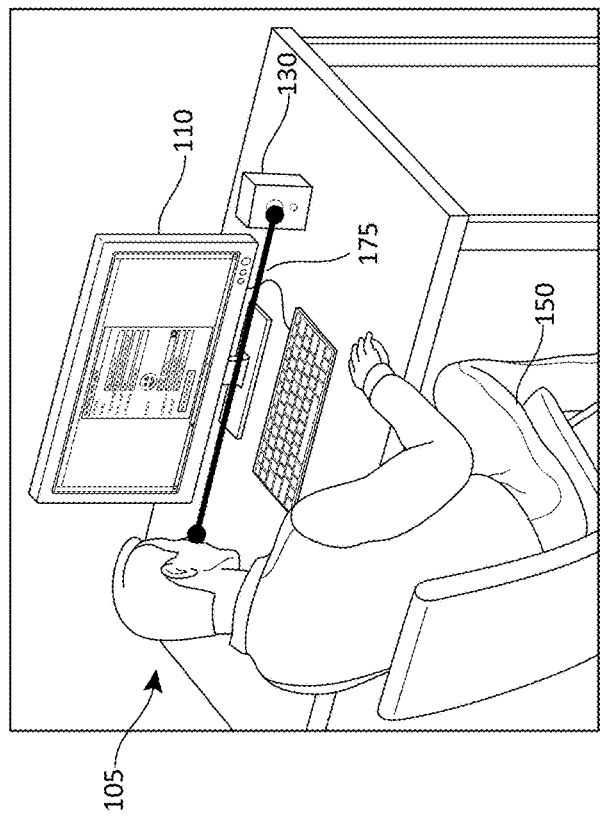
Figure 1C:
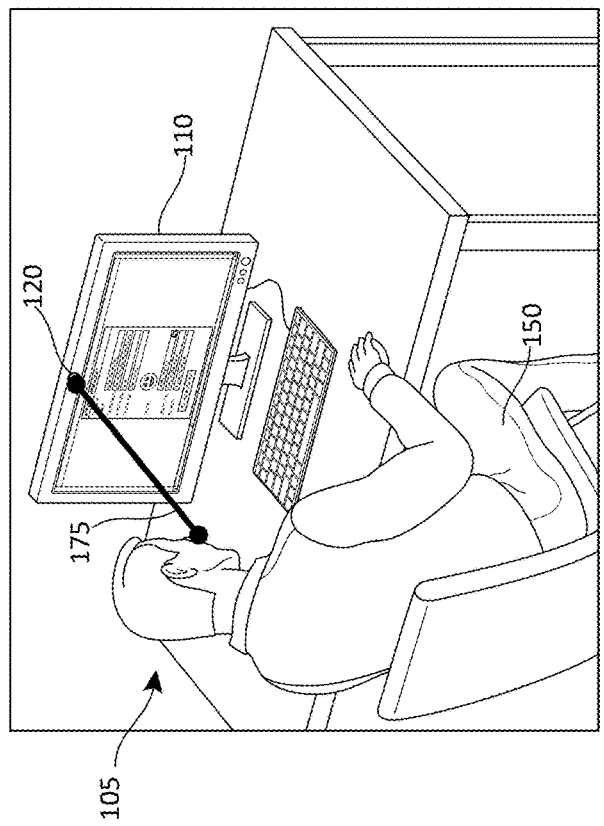

A user 150 can interact with the computing device using various input devices in the examples illustrated in FIGS. 1A and 1B. The computing device includes the keyboard 145, the mouse 140, and the display 110 which may be also be a touchscreen capable of receiving user input. The computing device 105 may be configured to execute an operating system, such as, but not limited to the Microsoft Windows operating system. The operating system may provide a graphical user interface in which the user may interact with one or more applications. The applications may be rendered in windows on a "desktop" which provides a work area for the user 150 to interact with the one or more applications. The desktop may also include controls, tools, menu bars, display areas for notifications, and other components with which the user may interact. FIGS. 1C and 1D are similar to FIGS. 1A and 1B, respectively, will be discussed later with respect to FIG. 3.

Figure 2A:
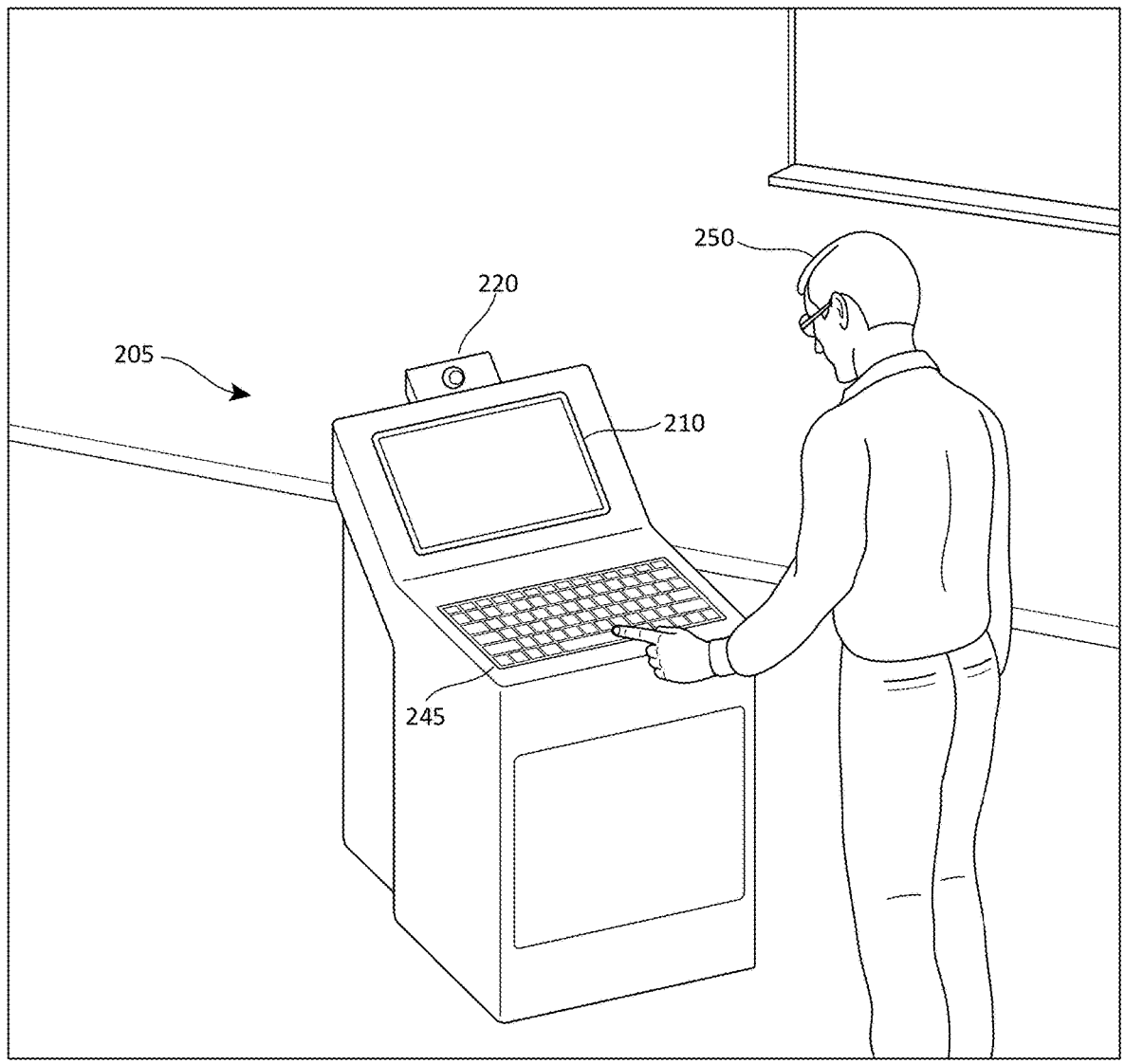
FIGS. 2A and 2B illustrate another example of a computing device on which the magnification techniques disclosed herein may be implemented.
Figure 2B:
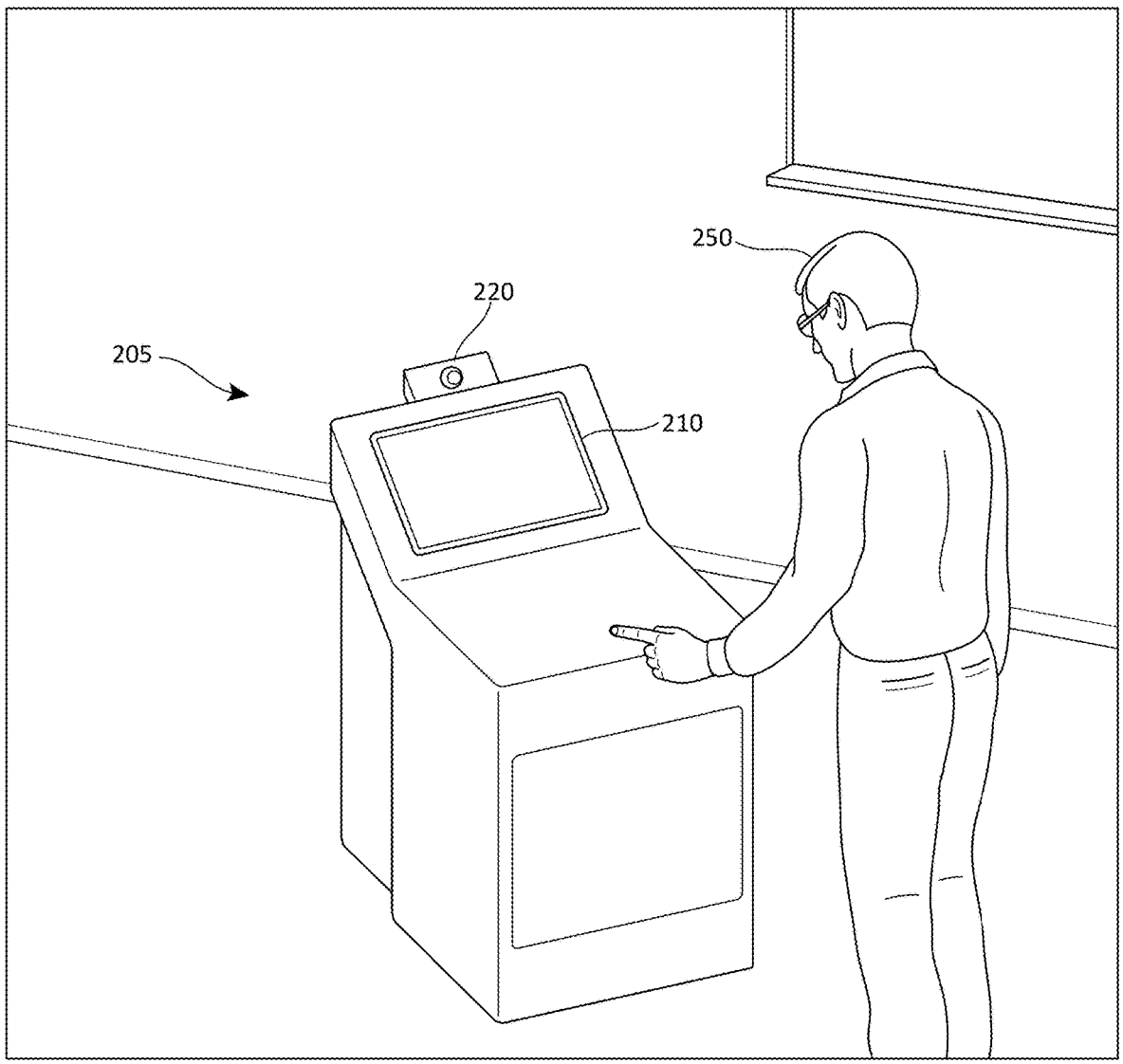

FIGS. 2A and 2B illustrate two example embodiments of computing device 205 which has the form factor of an interactive kiosk. The computing device 205 may be used to implement the various example implementations discussed herein instead of the computing device 105. An interactive kiosk, such as the computing device 205, may be utilized in a variety of locations. Such interactive kiosks may be used in airports, train stations, bus stations, and hotels to facilitate purchasing of a ticket, checking luggage, checking in for travel, obtaining information regarding a reservation, checking into a room and/or renting a room, and a variety of other services. Other type of kiosks may be used to provide information and/or to obtain other services in museums, libraries, monuments, national parks, and other such locations. Some kiosks may also be configured to operate as point of sale devices or vending machines where the user 205 may purchase goods and/or services. In other implementations, the kiosk may implement an automated teller machine, which may include a display 210 with a touchscreen interface and/or may include a keypad 245 for receiving user input. These examples are in no way limiting and other the computing device 205 may be used to implement other types of kiosk-type computing devices.

The computing device 205 may include a display 210. The display 210 may be a touchscreen for receiving user inputs. The computing device 205 may optionally include a keyboard or keypad 245 that provides a means of receiving user input, such as in the example illustrated in FIG. 2A. The computing device 205 may not include a keyboard or keypad 245 in some implementations, such as that illustrated in FIG. 2B, and the display 210 may be a touchscreen for receiving user input.

The example form factors of the computing devices 105 and 205 illustrated in the preceding examples merely illustrate some examples of the types of computing devices that may be used to implement the techniques disclosed herein for providing a magnifier user interface for magnifying content on the display of the computing device and are in no way limiting. Other types of computing devices may be used to implement the magnifier. The computing device may be tablet computer, a mobile phone or smart phone, a smart television, and/or other types of computing devices that include a display and either include one or more integrated cameras and/or are associated with one or more cameras that can be used to capture images and/or video of a user of the computing device.

Figure 3:
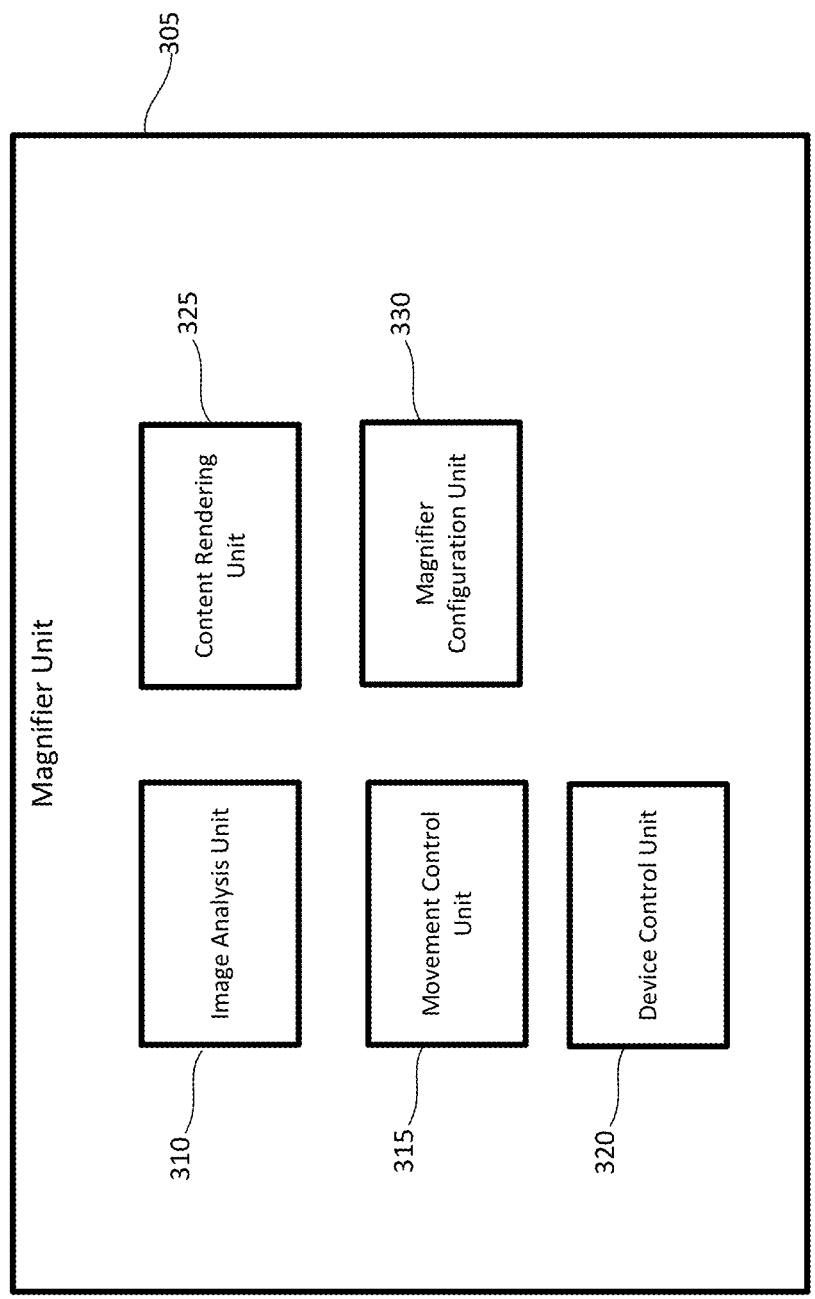
FIG. 3 is a functional block diagram of an example magnifier unit that may be implemented by a computing device.

FIG. 3 is a functional block diagram of an example magnifier unit 305 that can be implemented on the computing devices from the preceding examples. While the discussion of FIG. 3 refers to the computing device 105, the magnifier unit 305 may also be implemented on the computing device 205 illustrated in FIGS. 2A-2B. The magnifier unit 305 can comprise processor-executable program code that can be executed by a processor of the computing device 105 to generate a magnification user interface or "magnifier" on the display 110 of the computing device 105. The magnifier may magnify at least a portion of the content rendered on the display 110. The magnifier unit 305 may include an image analysis unit 310, a movement control unit 315, a device control unit 320, a content rendering unit 325, and configuration unit 330.

The magnifier unit 305 may be implemented, at least in part, by an operating system of the computing device 105, and/or may be implemented at least in part by one or more applications executed by a processor of the computing device 105 or the computing device 205. The functional components of the magnifier unit 305 discussed in this example are merely examples of some of the functions that the magnifier unit 305 may implement. Some of these functional components may be implemented as part of the operating system of the computing device 105, while others may be implemented by one or more applications comprising executable program code that may perform the functions described herein when executed by the processor of the computing device. In some implementations, the magnifier unit 305 may be implemented as program or service that is automatically executed at the time that computing device 105 is booted up or may be an application that is may be manually started by a user of the computing device 105.

The image analysis unit 310 may be configured to receive images and/or video captured by one or more cameras associated with the computing device 105. As illustrated, in the preceding examples, the camera may be integrated with the computing device 105 or may be a standalone camera that is configured to provide images and/or video to the computing device via a wired or wireless connection. The image analysis unit 310 may be configured to detect the presence of user in images and/or video captured by the camera. The image analysis unit 310 may implement a head-pose estimation neural network for extracting information that can be used for head and/or eye tracking.

The information output by the head-pose estimation neural network may be provided as an input to the movement control unit 315. The movement control unit 315 may be configured to translate into real-time movements of the magnifier about the display 110 or movements of the magnified content displayed by the magnifier where the magnifier is configured to be stationary on the display 110. Enabling the user control the movements of the magnifier through head and/or eye movements can provide a more natural user interface in which the user may look at content to be magnified rather than struggling with keyboard inputs, mouse or trackpad input, touchscreen input, and/or voice commands to try to maneuver the magnifier to magnify the contents of a desired portion of the contents of the display.

The content rendering unit 325 may render the magnifier on the display 110 of the computing device 105. The content rendering unit 325 may also render the magnified content displayed by the magnifier. The content rendering unit 325 may dynamically update the location on the display at which the magnifier is rendered and/or the magnified content displayed within the magnifier based on the head and/or eye tracking information provided by the image analysis unit 310.

The device control unit 320 may be configured to control one or more devices associated with the computing device 105 to minimize distractions while the user is attempting to view contents of the display of the computing device. The device control unit 320 may mute audio and/or video content playing on nearby devices that can be controlled via the computing device. The device control unit 320 may also control ambient lighting in the area in which the computing device is located where such lighting is controllable by the computing device. The device control unit 320 may also pause or mute audio and/or video content on the computing device itself to reduce distractions while the user is attempting to view content on the display of the computing device 105. The device control unit 320 may provide additional means for reducing distractions from on the computing device and from other devices associated with the computing device.

The configuration unit 330 may configure one or more operating parameters of the magnifier and/or of the display 110 of the computing device 105. The configuration unit 330 may alter the font size, font color, background color, screen brightness, size of the magnifier, and or other parameters of magnifier or the display 110 of the computing device. The configuration unit 330 may provide a user interface that allows a user of the device or an administrator of the device to configure default operating parameters of the magnifier. The user may interact with the magnifier to adjust the operating parameters these and other operating parameters as will be discussed in the examples that follow.

In some implementations, the computing device may include a dedicated tracking device that is separate from the camera or cameras of the computing device. In such implementations, all or part of the head position and/or image tracking performed by the image analysis unit 310 may be performed by the dedicated tracking device. The dedicated tracking device may be integrated with the computing device or may be connected to the computing device via a wired or wireless connection. The dedicated tracking device may be configured to output head position and/or tracking information that can be used by the movement control unit 315 similarly to the output from the head-pose estimation neural network discussed above. The dedicated tracking device may include one or more cameras for capturing images and/or video of the user of the computing device. The dedicated tracking device may include a processor, a memory, and/or other hardware and/or software components for performing the head-pose estimation and/or eye-tracking. The dedicated tracking device may, in some implementations, include one or more emitters that are configured to emit infrared (IR) and/or other wavelengths of light outside of the range of wavelengths typically visible to the human eye so as not interfere with the user's vision. The output of the dedicated tracking device may be provided to one or more of the modules of the magnifier unit 305 to provide head position and/or eye tracking information that may be used to control one or more aspect of the magnifier.

Figure 6:
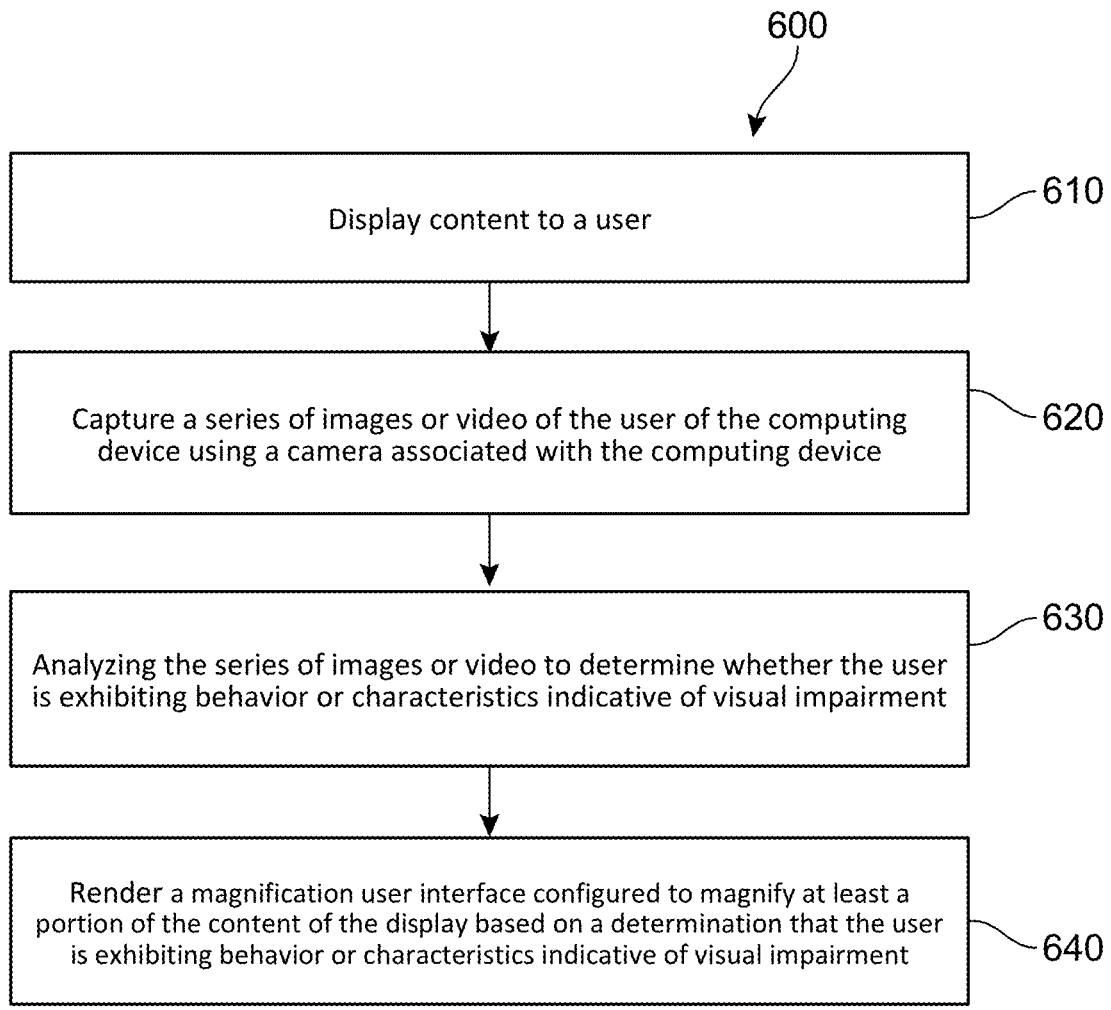
FIG. 6 presents a flowchart of an example process for rendering a magnification user interface on a display of a computing device.

FIG. 6 illustrates a flow chart of an example process 600 for operating the user interface of a computing device. The process 600 refers to the computing device 105 but may also be implemented by the computing device 205 illustrated in the preceding examples. The process 600 may be implemented by the magnifier unit 305 illustrated in FIG. 3.

The process 600 includes an operation 610 in which content is displayed to a user. The content may be displayed on a display 110 of the computing device 105. As discussed in the preceding examples, the type of content that may be displayed depends on how the computing device 105 is being utilized. If the computing device 105 is a laptop or personal computer, the user may be executing one or more applications, such as a web browser, an email client, a spreadsheet, a document editor, a communication application for communicating with other users via text messages, audio, and/or video content. Other types of applications for reading and/or creating content of various types may also be executed. If the computing device is a smart phone or a tablet, the user may be executing a similar set of applications on these devices that are configured for the typically smaller form factor of the display of such computing devices. The computing device may be a kiosk that displays a bank interface, a point of sale interface, an information interface, or other content as discussed in the preceding examples.

The process 600 may include a second operation 620 in which a series of images and/or video of the user of the computing device 105 are captured. The computing device 105 may include one or more cameras that are integrated with the computing device or connected to the computing device 105 via wired or wireless connections. The camera or cameras may provide varying levels of fidelity and the techniques disclosed herein can adapt to the camera fidelity. In some implementations, the camera may be lower resolution web camera capable of capturing lower resolution images and/or video, in other implementations the camera may be a high-resolution camera capable of capturing high definition images and/or video. For example, a low-resolution video camera may be capable of supporting Video Graphics Array (VGA) 640×480 resolution, while a high-resolution video camera may be capable of supporting 4K Ultra High Definition (UHD) digital format. Other digital formats may be supported by the camera or cameras associated with the computing device 105. In implementations where the where camera fidelity is low, the magnifier unit 305 may be able to perform head tracking on the images but is unable to perform eye tracking due to the limited resolution of the images and/or video captured by the camera. Higher resolution images and/or video may allow the magnifier unit 305 to provide more accurate head and/or eye tracking, which the magnifier unit 305 may translate into more fine-grained control over the movement of the magnifier about the display 110 and/or scrolling of the magnified content displayed by the magnifier.

The process 600 may include a third operation 630 in which the series of images or video is analyzed to determine whether the user is exhibiting behavior or characteristics indicative of visual impairment. One aspect of the techniques disclosed herein is that the computing device can be configured to analyze images and/or video of the user to determine whether the user may be struggling with a visual impairment that makes reading the content displayed on the display of the computing device difficult. Various behaviors by the user and/or characteristics of the user may be used to determine that the user may be suffering from a visual impairment.

One way that a determination may be made whether the user is detected to be close to the display of the computing device, which may indicate that the user is experiencing difficulty reading the content presented on the display of the computing device. The computing device can be configured to determine how far the user is from the display 110 of the computing device 105 by determining a position of the user's head in the images and/or video captured by the camera of the computing device 110 and estimating how far the user is from the display 110 based on the size of the user's head in the images and/or video. In the example illustrated in FIG. 1C, the computing device 105 can be configured to determine a distance 175 from the camera 120 to the head of the user 150, and in the example illustrated in FIG. 1D, the computing device can be configured to determine a distance 175 from the camera 130. In some implementations, the images or video collected by the camera may be input into a head-pose estimation neural network trained to output head position information of a person in an image or video. The head position information can include head-angle information indicative of an angle of tilt of the user's head. The head-pose estimation neural network may also generate information indicative of the location of the user's head within the image or video. In some implementations, the head-pose estimation neural network may generate a bounding box 405 around the head of the user 150, such as in FIGS. 4A and 4B. In other implementations, the magnifier logic may calculate the bounding box 405 surrounding the face of the user based on head location information output by the head-pose estimation neural network.

Figure 4A:
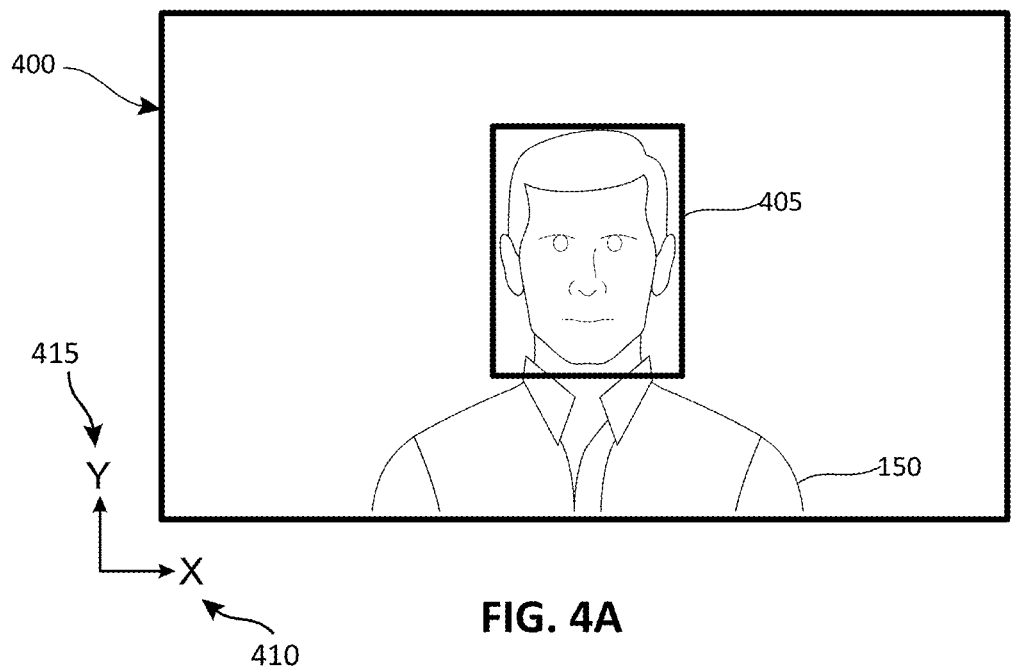
FIGS. 4A and 4B are a diagram illustrating face recognition of a user in an image captured by a camera of the computing device.
Figure 4B:
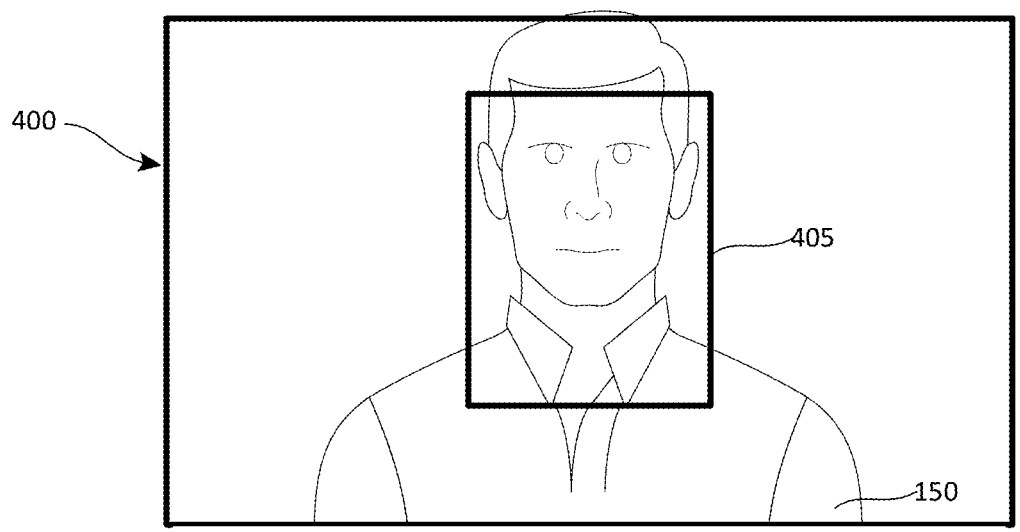

FIGS. 4A and 4B illustrate an example field of view 400 of the camera of the computing device 120 illustrated in FIG. 1A. For reference purposes, a first axis 410 substantially parallel to the horizontal axis of the field view 400 and a second axis 415 substantially orthogonal to the first axis 410 are depicted. The second axis 415 is also referred to herein as the "height" or the "y-axis" of the field of view 400, and the first axis 410 is also referred to herein as the "width" or the "x-axis" of the field of view 400. The first axis 410 and the second axis 415 are merely included for reference purposes and would not typically be rendered in an image of the field of view 400 of the camera 120 of the computing device 105.

The size of the user's head can be estimated based on the dimensions of the bounding box 405. The dimensions of the bounding box 405 can be determined by determining a width and height of the bounding box 405 in pixels. The dimensions of the bounding box 405 may alternatively be determined as a percentage of the width and height of the field of view 400 of the camera 120 of the computing device 105. FIG. 4A illustrates an example where the user is at a first position relative to the camera 120 of the computing device 105, and FIG. 4B illustrates an example where the user is at a second position relative to the camera 120 of the computing device 105. The user is closer to the camera in the second position and the dimensions of the bounding box 405 are larger in the example illustrated in FIG. 4B.

An estimate of how far the user 150 is from the display 110 of the computing device 105 can be determined by comparing the dimensions of the bounding box 405 with an average head size data. The average head size data may include average dimensions of a human head at a predetermined distance from the camera 120. The average head size data may include average dimension of the human head at multiple predetermined distances from the camera 120. The dimensions of the bounding box 405 can be compared to the average head size data to determine an estimated distance of the user from the display 110 of the computing device 105. If the user is closer than a predetermined threshold distance from the display 110 of the computing device 105, then the magnifier unit 305 can be configured to determine that the user's face is close to the display 110 of the computing device 105. This proximity to the display 110 may indicate that the user may be suffering from visual impairment and is having difficulty viewing the contents of the display 110. In some implementations, the magnifier unit will make a determination that the user is experiencing difficulty if the user remains close to the display 110 for at least a predetermined period of time, or the user has come within close proximity of the display 110 at least a predetermined number of times. The magnifier unit can rely on such thresholds to prevent false positives in situations where the user may temporarily come close to the display 110 of the computing device 105 for reasons unrelated to visual impairment issues. For example, the user 150 may have been adjusting a component of the computing device 150 or reaching for an object close to the display 110 of the computing device 105.

The magnifier unit may determine that the user is experiencing visual impairment issues based on other factors in addition to or instead of the user's proximity to the display 110 of the computing device 105. For users who are identified or authenticated users of the computing device 105, the computing device 105 may have captured biometric information about the user that may include facial feature information. This facial feature information may include an indication whether the user typically wears glasses. The information indicative of whether the user wear glasses may be static. This information may be determined at the time that a user account is set up for the user. In other implementations, the facial feature information may be updated periodically by capturing an image of the user, which can be analyzed to determine whether the user is wearing glasses. If the magnifier unit detects in the images and/or video captured by the camera 120 of the computing device 105 that the user 150 is not wearing glasses but is expected to be wearing glasses based on the user account information, then the magnifier unit may make a determination that the user may have difficulty viewing the contents of the display 110 of the computing device 105.

Figure 5A:
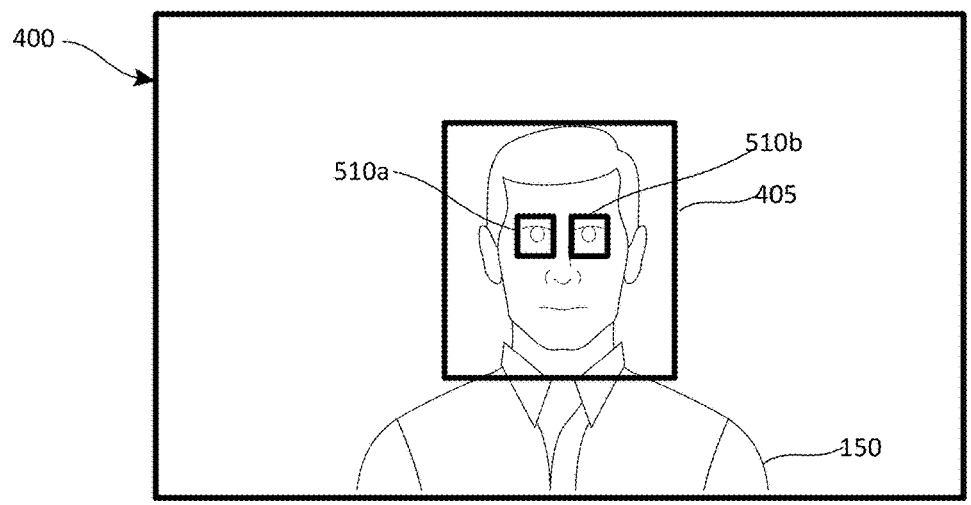
FIGS. 5A and 5B are a diagram illustrating face and eye recognition of a user in an image captured by a camera of the computing device.
Figure 5B:
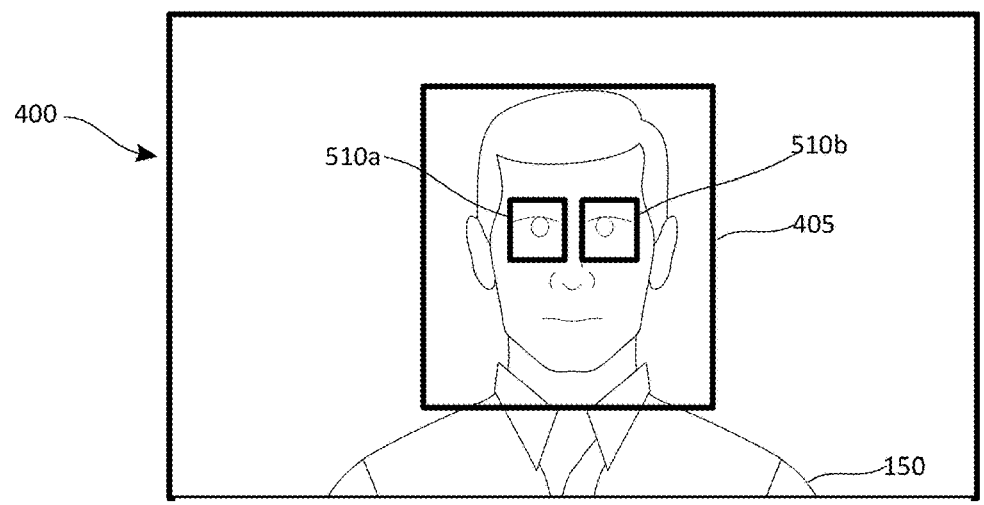

Another factor that the magnifier unit may consider when determining whether the user appears to be having visual impairment problems is whether the user is squinting. Squinting occurs when a user looks a something with one or both eyes partly closed in an attempt to see more clearly. Users with visual impairment problems may be light sensitive, and squinting may be indicative of the brightness of the display being too high for the user to comfortably view. Squinting may also be a result of the user straining to view content which may be too small to be comfortably viewed by the user. The magnifier unit may be configured to detect the user's eyes in the images and/or video captured by the camera 120 of the computing device 105. FIG. 5A illustrates the field of view 405 of FIG. 4A but includes bounding boxes 510a and 510b surrounding the eyes of the user 150. FIG. 5B illustrates the field of view 405 of FIG. 4B but includes bounding boxes 510a and 510b surrounding the eyes of the user 150. The head-pose estimation neural network may be configured to identify the location of the user's eyes and to provide the user's eye location information with the head position information output by the neural network. In some implementations, the head-pose estimation neural network may be configured to monitor the openness of the user's eyes and determine whether a decrease in the openness of the eyes that are indicative of the user squinting.

Figure 5C:
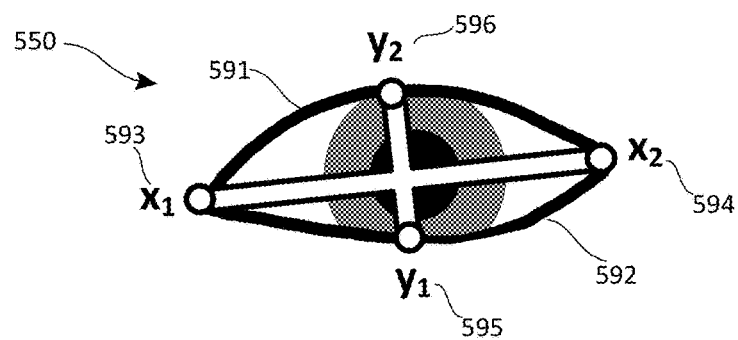
FIG. 5C is a diagram illustrating an example for determining an eye aspect ratio in an image captured by a camera of the computing device.

In some implementations, the image analysis unit 310 may be configured to determine whether the user is squinting based on changes in the aspect ratio of the user's eyes. FIG. 5C is a diagram illustrating an example for determining an eye aspect ratio in an image captured by a camera of the computing device. FIG. 5C illustrates one of the user's eyes 550 identified in the image captured by the camera. The aspect ratio of the user's eye 550 represents a width of eye opening along a substantially horizontal X-axis and a height of the eye opening along a substantially vertical Y-axis. In this example, the width of the eye opening along the X-axis is measured from a point located at each corner of the eye, $X_1$ 593 and $X_2$ 594, and the height of the eye opening along the Y-axis can be measured from a point substantially at the midpoint $y_1$ 595 of the arc formed by the lower eyelid 592 and a point substantially at the midpoint $y_2$ 596 of the arc formed by the upper eyelid 591. Other points in addition or instead of these points may be used to determine the aspect ratio of the eye opening in other implementations. When the user closes their eye, for example to squint, the aspect ratio of the eye will change and the ratio of the width of the eye relative to the height of the eye will increase because the height of the eye opening decreases as the user squints. The image analysis unit 310 may be configured to determine that the user is squinting if the aspect ratio of the width of the eye opening to the height exceeds a predetermined threshold.

The magnifier unit 305 may be configured to take into account one or more of the factors discussed above when making a determination whether the user is exhibiting behavior or characteristics indicative of visual impairment. In some implementations, one of these factors alone may be sufficient for the magnifier unit to determine that the user is exhibiting behavior or characteristics indicative of visual impairment. The distance of the user's head from the display 110 of the computing device may be sufficient to trigger the magnifier unit 305 to render the magnifier in some implementations. Detection of the user squinting and/or is not wearing glasses as expected may be sufficient to trigger the rendering of the magnifier even if the user is not determined to be within a predetermined threshold distance from the display 110 of the computing device 105.

The process 600 may include a fourth operation 640 in which a magnifier is rendered on the display 110. The magnifier is configured to magnify at least a portion of the content of the display 110 based on a determination that the user is exhibiting behavior or characteristics indicative of visual impairment. The attributes of the magnifier can be dynamically adjusted based to the visual impairment needs of the user as will be described in greater detail in the examples the follow. The magnifier can take a number of actions that may assist the user in viewing the content rendered on the display 110 of the computing device 110.

Figure 7A:
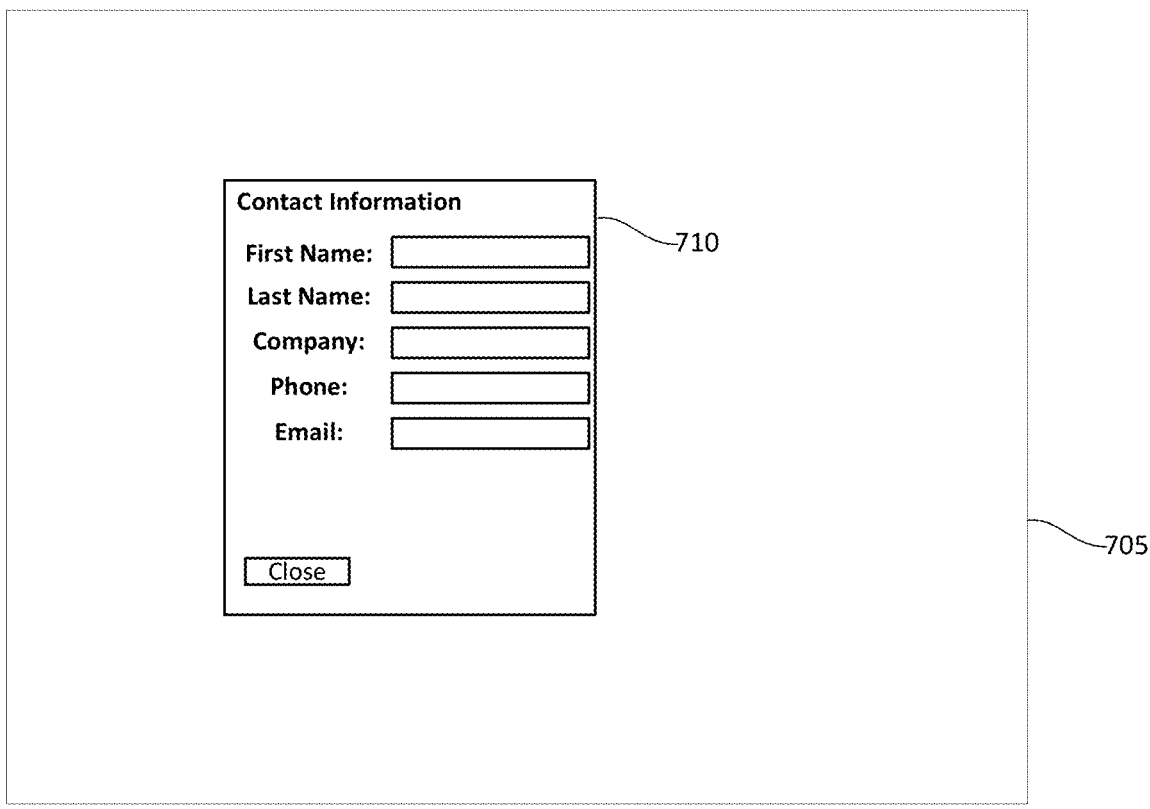
FIGS. 7A, 7B, and 7C illustrate an example magnification user interface.
Figure 7B:
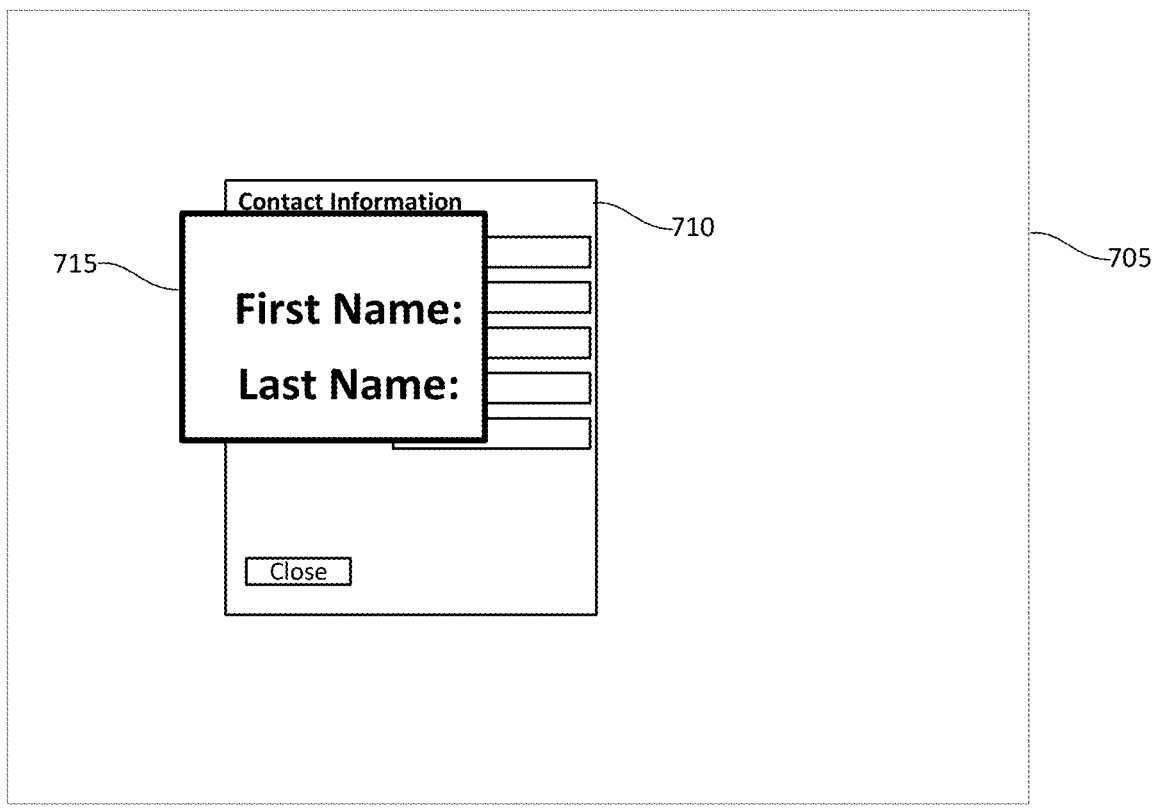
Figure 7C:
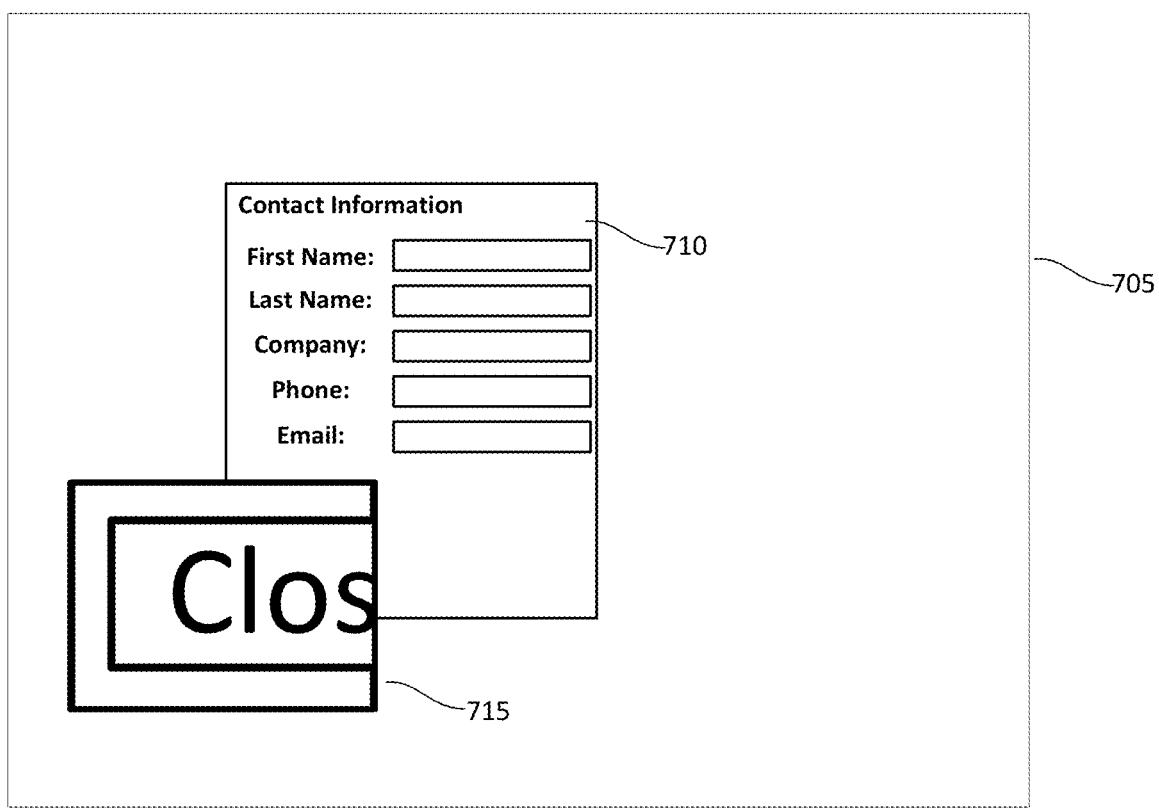

The magnifier may be configurable to operate in a full-screen mode in which the magnifier covers all or substantially all of the display 110, and the user can scroll the contents displayed within the magnifier to see a magnified rendering of different parts of the original, unmagnified contents of the display 110. The magnifier may be configurable to operate in a "lens" mode, as illustrated in FIGS. 7A-7C. In the lens mode, the magnifier functions similarly to a magnifying glass that can be moved about the screen to magnify a portion of the content rendered on the display 110. The size of the lens may be configurable to smaller or larger to suit the needs of the user. The magnifier may be configurable to operate in a "docked" mode. In the docked mode, the magnifier is rendered at a fixed location on the display 110 of the computing device 105. The size of the user interface may be adjusted to suit the needs of the user as in the lens mode. The magnified contents of the docked magnifier may be dynamically updated as the user moves a pointer device around on the display 110 to provide a magnified rendering of the portion of the screen surrounding the pointer device.

The magnifier unit 305 may use head and/or eye tracking to determine where the user is looking on the screen. The magnifier unit may also use head and/or eye tracking to determine what the user is doing. Lateral head and/or eye movements may be indicative of the user reading content, whereas head and/or eye movement jumping focusing on two distinct areas of the screen may indicate that the user is actively using more than one application on the computing device 105. The magnifier unit 305 may also determine that the user is reading based on a type of application with which the user is engaged. Some applications may collectively be classified as "reading" applications even though the user may perform other related activities, such as editing or creating content or viewing non-text content in the application. Examples of reading applications may include a text editor or document editor, a web browser, a document viewer, a electronic book (e-book) reader application, an email application, or a messaging application. Other types of applications may also be classified as reading applications.

The magnifier unit may use head and/or eye movement to control the movement of the magnifier in the lens mode. FIG. 7A illustrates an example of a desktop 705 of a computing device 105 that may be displayed on the display 110. The desktop 705 includes a single application window 710. However, other implementations may have multiple application windows associated with one or more applications displayed on the desktop 705. The camera 120 of the computing device can capture a series of images and/or video of the user and perform head and/or eye tracking as the user is using the computing device 105. The magnifier unit may automatically launch the magnifier on the display 110 responsive to the magnifier unit determining that the user is exhibiting behavior or characteristics indicative of visual impairment. The user may also manually launch the magnifier by entering a launch command via a keyboard, via a voice interface, or by selecting the magnifier unit from a menu of applications available to the user on the computing device 105. FIG. 7B illustrates an example of the magnifier 715 rendered on the desktop 705. The magnifier 715 includes a magnified portion of the application window 710. The magnifier unit can continue to track the head and/or eye movements of the user and dynamically render the magnifier 715 at a new location based on the detected head and/or eye movements of the user. FIG. 7C illustrates an example where the user's head and/or eye movements indicate that the user is looking at the lower portion of the application window 710 and the location of the magnifier 715 has been updated to reflect the new location on the display 110 at which the user is looking. The magnifier unit can be configured to smoothly move the magnifier 715 from one location to the next by providing a series of renderings of the lens at different locations along a path between a first location and a second location on the display 110 which the user appears to be looking.

Head tracking and/or eye tracking can also be used to control the magnifier unit when the magnifier is configured to operate in the full-screen mode and the docked mode. In the full-screen mode, head and/or eye movements can be used by the magnifier unit to scroll the magnified contents displayed in the viewport of the magnifier according to a direction in which the head and/or eye movements indicate that the user is looking. In the docked mode, the head and/or eye movements can be used to control the location of the pointer device on the screen, and the contents of the docked magnifier can be updated as the pointer device moves about the display 110.

Head and/or eye tracking may also be used to control one or more attributes of the magnifier. The magnifier unit 305 can be configured to analyze images and/or video content captured by the camera 120 of the computing device 105 to identify head and/or eye movements associated with configuration commands and to execute these configuration commands to configure one or more parameters of the magnifier. In some implementations, the magnifier unit may include a configuration menu that provides a means for associating configuration commands with a predetermined set of head and/or eye movements. The user selects a particular head and/or eye movement from a list of head and/or eye movements recognized by the magnifier unit.

The magnifier unit 305 may use head and/or eye tracking to control a zoom level used to generate the magnified content displayed by the magnifier. The magnifier unit can detect that the user has moved closer or further away from the display 110 of the computing device 105 based on the techniques disclosed in the preceding examples. The head-pose estimation neural network may generate a bounding box 405 around the head of the user 150, such as in FIGS. 4A and 4B. Increases in the dimensions of the bounding box 405 can indicate that the user has moved their head closer to the display 110 of the computing device 105, and decreases in the dimensions of the bounding box 405 can indicate that the user has moved their head further away from the display 110 of the computing device 105. The magnifier unit 305 can be configured to identify when the user has moved closer to the display 110 of the computing device 105 and to increase the zoom level of the magnified content displayed by the magnifier in this particular example. The magnifier unit 305 can be configured to identify when the user has moved farther away from the display 110 and to decrease the zoom level of the magnified content displayed by the magnifier. As discussed in the preceding examples, the magnifier may be configured to operate slightly differently than this example in response to user proximity to the display 110. For example, the zoom level may be held at a constant level if the user moves away from the display in response to the magnifier increasing the magnification level applied or the zoom level may be increased as the user moves away from the display of the computing device in an amount that is proportion to how far away the user has moved away from the display 110.

The magnifier unit 305 may be configured to respond to eye tracking gestures to control the zoom level of the computing device. In some implementations, the magnifier unit 305 may be configured to detect that a user has winked (i.e., briefly closed one eye). The magnifier unit 305 may be configured to increase the zoom level in response to the user winking with their right eye and to decrease the zoom level in response to the user winking with their left eye. The magnifier unit 305 may be configured to recognize other eye gestures for controlling the magnification level in addition to or instead of this example.

The magnifier unit 305 may use head and/or eye tracking to control the size of the magnifier. The head-pose estimation neural network may be configured to determine a head angle of the user in the images and/or video captured by the camera 120 of the computing device 105. The magnifier unit can be configured to analyze the head angle of the user. The magnifier unit may be configured to increase or decrease the dimensions of the magnifier based on the head angle of the user detected in the images and/or video of the user captured by the camera 120 of the computing device 105. In one implementation, the magnifier unit can be configured to increase the size of the magnifier if the user tilts their head to the right and to decrease the size of the magnifier if the user tilts their head to the left. The magnifier unit 305 may be configured to respond to eye tracking gestures to control the size of the magnifier. The magnifier unit 305 may be configured to increase the size of the magnifier in response to the user winking with their right eye and to decrease the size of the magnifier in response to the user winking with their left eye. The magnifier unit 305 may be configured to recognize other eye gestures for controlling the size of the magnifier in addition to or instead of this example.

The magnifier unit may also use head and/or eye tracking to control one or more display attributes of the magnified content displayed by the magnifier and/or content displayed by the display 110. The magnifier unit may modify font color, background colors, display brightness, and/or other attributes of the contents of the display 110. The magnifier unit can be configured to automatically modify one or more display attributes of the magnified content displayed by the magnifier and/or content displayed by the display 110 in response to determining that the user is exhibiting behavior or characteristics indicative of visual impairment, such as proximity to the display 110 and/or squinting. Users who have color blindness may have difficulty reading certain font colors on certain background colors, and certain font color and background color combinations may be difficult to read for users who have visual impairment problems. Some users who have visual impairment problems may also experience light sensitivity. The magnifier unit can be configured to change the font colors and/or background colors used to render the magnified content displayed by the magnifier and/or by the display 110 to a high-contrast font color and background color combination that may be easier for users with color blindness or visual impairment issues read. The magnifier unit may also employ other techniques such as switching the operating system of the computing device to use a "dark mode" color scheme which uses light-colored text and graphical user interface components over a dark colored background. Some operating systems of the computing device may provide a dark mode option, and the magnifier unit can be configured to active the dark mode. In other implementations, the operating system of the computing device may not provide a dark mode color schemed, but the magnifier unit can be configured to automatically change the colors used for the font, graphical user interface, and background in order to provide a similar user experience as would be provided by a dark mode.

The magnifier unit 305 can be configured to operate in a "reading mode" in which the movement of the magnifier can be limited to "pan" across the screen in response to the magnifier unit determining that the user appears to be reading. The magnifier unit 305 may limit the movement of the magnifier by permitting the magnifier to move laterally across the display 110 while reducing or preventing the magnifier from moving vertically across the display 110. Reading content using conventional magnifier control techniques based on keyboard, mouse, and/or touch inputs can require a significant effort by the user and can quickly becoming tiring. Furthermore, users may have a difficult time keeping the magnifier unit lined up properly with the textual content as the user attempts to read a line of text. The magnifier unit 304 can be configured to prevent or significantly reduce the movement of the magnifier vertically to allow the user to pan laterally across the content. The magnifier unit 305 may be configured to permit the magnifier to pan vertically once the end of the line of text is reached by the magnifier. The magnifier unit 305 may be configured allow the user to override the reading mode of operation by pressing a key or key combination on the keyboard of the computing device 105, entering a voice command to cancel the reading mode of the magnifier, or by performing a head or eye gesture to return the magnifier unit 305 to a previous free-roaming mode of operation.

The magnifier unit 305 can be configured to determine that the user appears to be reading based on signals received from the operating system, the application in which the user is reading the content, user head and/or eye movements, or a combination thereof. The combination of these signals can be used to determine the intent of the user. An application may provide information that indicates that the application is a reading type application. In one example, the user is reading a web-based article in a web browser, and the web browser can provide an indication that the user is reading content. Furthermore, the head and/or eye tracking may determine that the user appears to be moving their head and/or eyes laterally across the display, which is indicative of the user reading content. The combination of these signals may be sufficient for the magnifier unit 305 to determine that the user intends to read content and the reading mode of the magnifier should be enabled. In another example, the user is viewing a map in a mapping application and the head and/or eye movements indicate that the user is browsing the map data, but the head and/or eye movements do not indicate that the user is reading. The magnifier unit 305 may determine that the user is not intending to read content and that the reading mode of the magnifier should not be enabled. In yet another example, the user may have multiple applications open on the desktop including a document editor and an image editor program. The operating system may provide an indication to the magnifier unit 305 that the document editor has focus, and the head and/or eye movements include lateral movements that indicate that the user may be reading. The magnifier unit 305 may determine that the reading mode of the magnifier should be activated in this situation. However, if the image editor program instead had focus, then the magnifier unit 305 may determine that the reading mode of the magnifier should not be activated even though the head and/or eye movements of the user included lateral movements that may have been indicative of reading because a non-reading application has focus. The preceding examples illustrate some of the types of signals that the magnifier unit 305 may utilize to determine whether the activate the reading mode of the magnifier. Other signals may be received from the operating system, application, and/or from the user that may indicate that the user is or is not reading.

The magnifier unit 305 may also be configured to control devices associated with the computing device 105 to minimize distractions. For example, the computing device 105 may be associated with one or more Internet of Things (IoT) devices that may be controlled by the computing device 120. Nearby lighting controllable by the computing device 105 may be dimmed to reduce glare on the display 110 of the computing device 105 and to reduce bright ambient lighting that may disturb a user with visual impairments who is light sensitive. Nearby audio and/or video equipment controllable by the computing device 105, such as televisions, speakers, video game consoles, tablet computers, mobile phones, and smart watch or other wearable computing devices, may have audio output muted or audio or video content paused. Mobile phones and other devices may be placed into a do not disturb mode to prevent notifications, alerts, and incoming calls from making any noise, vibrations, or displaying any potentially distracting content on the display of the external device to reduce distractions. The magnifier unit can be configured to restore the state of each of these devices when the magnifier is closed or is determined to no longer be required.

The magnifier unit 305 may be configured to reduce audio and visual distractions on the computing device 105 to improve the user experience by removing other distractions that may interfere with the user's ability to concentrate and focus on reading. The magnifier unit 305 may be configured to reduce visual distractions in while the magnifier is in use to reduce distractions that may cause the user to lose focus on the task that they are trying to accomplish. The magnifier unit 305 may be configured to reduce visual distractions by performing one or more of the following tasks: (1) auto-pausing audiovisual media being played by the computing device, (2) deemphasizing content to reduce visual noise, and (3) providing intelligent handling of notifications and alerts to reduce distractions. The magnifier unit 305 may be configured to pause all audiovisual media on the device, such as streaming video content, video games, and/or other such content that may include visual content that may distract the user from the content being viewed in the magnifier. The magnifier unit 305 may be configured to pause all content that is not currently being magnified by the magnifier. The magnifier unit 305 can be configured to deemphasize content that is not currently the focus of the user's attention to reduce visual distractions. The magnifier unit 305 can be configured to determine which application a user is viewing based on the head and/or eye position of the user, a location of an onscreen pointer device, and/or the application associated with content being rendered as magnified content by the magnifier. The magnifier unit 305 can determine what content is the focus of the user's attention based on what content is currently being magnified by the magnifier. Content that is on the periphery of the magnifier may be blurred, the colors saturation of the content may be reduced, the brightness of the content may be reduced, and/or other such modifications may be made to reduce the visual noise associated with this content. Furthermore, the magnifier unit 305 can be configured to automatically mute audio output and/or pause video content associated with other application that are currently not the focus of attention by the user. The operating system of the computing device 105 may provide an Application Programming Interface (API) for controlling the audio output of applications or the applications themselves may provide an API for controlling the volume of audio output by the application. The magnifier unit 305 can be configured to reactivate the audio output and/or resume playback of audio or video content in an application if the focus of the attention of the user moves to an application for which audio output has been muted and/or content playback has been paused.

The magnifier 305 may also be configured to provide for intelligent handling of notifications and alerts while the magnifier is being utilized. Typically, alerts and notifications are displayed on a particular area of the display and may be accompanied by an audible and/or haptic indication of the occurrence of the alert or the notification. For a user without any visual impairments, such alerts and notifications may already be a significant distraction. For users with visual impairments, such alerts and notifications present an additional distraction, because the user may need to navigate the magnifier over to the alert or notification in order to view the alert or notification and then navigate the magnifier back to the previous location where the user was viewing content with the magnifier. The magnifier unit 305 can provide several solutions to this problem. One approach that the magnifier unit 305 may take is to suppress all alerts and notifications while the magnifier is being used. Another approach is that the magnifier unit 305 may take is to temporarily shift the viewport of the magnifier to the alert and/or notification to provide the user with an opportunity to view the alert and/or notification and to return the viewport of the magnifier back to the content that the user was viewing prior to the alert or notification once the user has viewed the alert or notification. Another approach is to reposition the alert and/or notification at or near the location of the display currently being magnified rather than shifting the viewport of the magnifier unit 305. In yet another approach, the magnifier unit 305 may be configured to respond to a head and/or eye gesture to view the alert or notification and another head and/or eye gesture to indicate that the user has viewed the alert or notification and would like to return to the content that was being viewed prior to the alert or notification.

The magnifier unit 305 may be configured to launch based on an emotional or cognitive state of the user and/or a level of engagement of the user. The image analysis unit 310 may be configured to include functionality for determining an emotional or cognitive state of the user based on the images and/or video of the user to determine a posture or gestures of the user. The image analysis unit 310 may include an emotional state/cognitive state estimation neural network that can analyze the images and/or video of the user to determine whether the user may be angry, frustrated, distracted, and/or struggling to complete a task. If the output from the neural network indicates that the user may be angry, frustrated, distracted, and/or struggling to complete a task, then the magnifier unit 305 may automatically launch the magnifier. The magnifier unit 305 may also monitor key presses, mouse clicks, and other user interactions with the computing device 105 to determine whether theses user interactions are indicative of the user having trouble using the computing device. The user interaction information collected by the magnifier unit 305 may be provided to the neural network as an input for analysis. The user interaction information may alternatively be analyzed separately from the image and/or video captured by the camera of the computing device 105. The magnifier unit 305 may also render a user interface that walks the user through a short demonstration illustrates how to use the magnifier. The user demonstration may also walk the user through personalizing the configuration of the magnifier to the needs of the user. By recognizing that the user may be struggling with the computing device, the magnifier unit 305 may provide proactive assistance to the user and demonstrate an assistive technology that is available to user and of which the user may not have had any knowledge that the assistive technology existed.

While the preceding examples discuss configuring the operation of the magnifier based on user presence, the magnifier illustrates just one example one possible implementation of the techniques for configuring a computing device based on user presence disclosed herein. These techniques may be implemented by the operating system and/or natively implemented by one or more applications installed on the computing device. The operating system and/or one or more applications on the computing device may implement one or more of the functional aspects of the magnifier unit 305 discussed in the preceding examples.

The operating system may be configured to detect user proximity to the display of the computing device, as discussed above with respect to the image analysis unit 310 of the magnifier unit 305, and/or using a dedicated tracking device as discussed in the preceding example. The operating system may use head-tracking and/or eye tracking information to adjust one or more parameters of the operating system. The operating system may adjust display-related parameters of the operating system, such as the display brightness, font size, font and background colors, and contrast based on the head-tracking and/or eye tracking information. The operating system may also adjust a scaling factor applied to contents of one or more displays of the computing device. The scaling factor can be used to increase or decrease the relative size of content rendered on the display. For example, the scaling factor may be used to adjust the dots per inch (DPI) of content rendered on a display of the computing device. The operating system may apply these changes across all or a subset of the active applications on the computing device, such as an application that currently has focus or an application at which the user's gaze appears to be directed. The operating system may implement these techniques to improve the Out of Box Experience (OOBE) of the user by enabling the user to configure various display-related parameters while personalizing the computing device. Additional examples discussing additional aspects of the computing device that may be configured during the OOBE are discussed in the examples that follow.

One or more applications on the computing device may implement at least a portion of the techniques for adjusting one or more operating parameters of the computing device based on user presence. Applications, such as a web browser, an e-book reader, a mapping or navigation application, and/or other types of application may be configured to obtain head and/or eye tracking information similarly to the techniques of the image analysis unit 310 of the magnifier unit 305 and/or through a dedicated tracking device. An application configured to utilize these techniques may provide zoom level control, font color and sizing control, display brightness controls, and/or other features discussed above with respect to the magnifier. Such applications may also facilitate navigating through the application using head and/or eye-tracking to control the location of a pointer device and/or other features of the application.

The magnifier unit 305 provides adaptive assistive technology that may assist a user experiencing visual impairment. In the examples that follow, an adaptive assistive technology unit that is configured to recognize that a user of the computing device 105 may benefit from one or more adaptive assistive technologies provided by the computing device 105. The assistive technologies may provide tools for assisting users not only with visual impairments, but also with auditory, mobility, and other types of impairments that may impact the user's ability to use the computing device. The AATU may recognize that the user may be experiencing impairment and may present to the user one or more adaptive assistive technologies that may assist the user. The AATU can be configured to automatically launch the adaptive assistive technologies and/or may present a user interface to the user that indicates the availability of these technologies and walks the user through personalizing these technologies for their own use. The AATU provides a significant improvement over conventional approaches to assistive technology on computing devices. The AATU can determine that the user may be experiencing an impairment that may negatively impact their user experience when using the computing device and proactively recommend one or more adaptive technologies that may assist the user in addressing these issues. These adaptive assistive technologies may assist the user in personalizing one or more aspects of the computing device in view of the impairments experienced by the user to provide a significantly improved user experience. The approach provided by the AATU provides an interactive approach to adapting assistive technologies to a particular user without requiring that the user have advance knowledge of these assistive technologies or how to use them.

Figure 8:
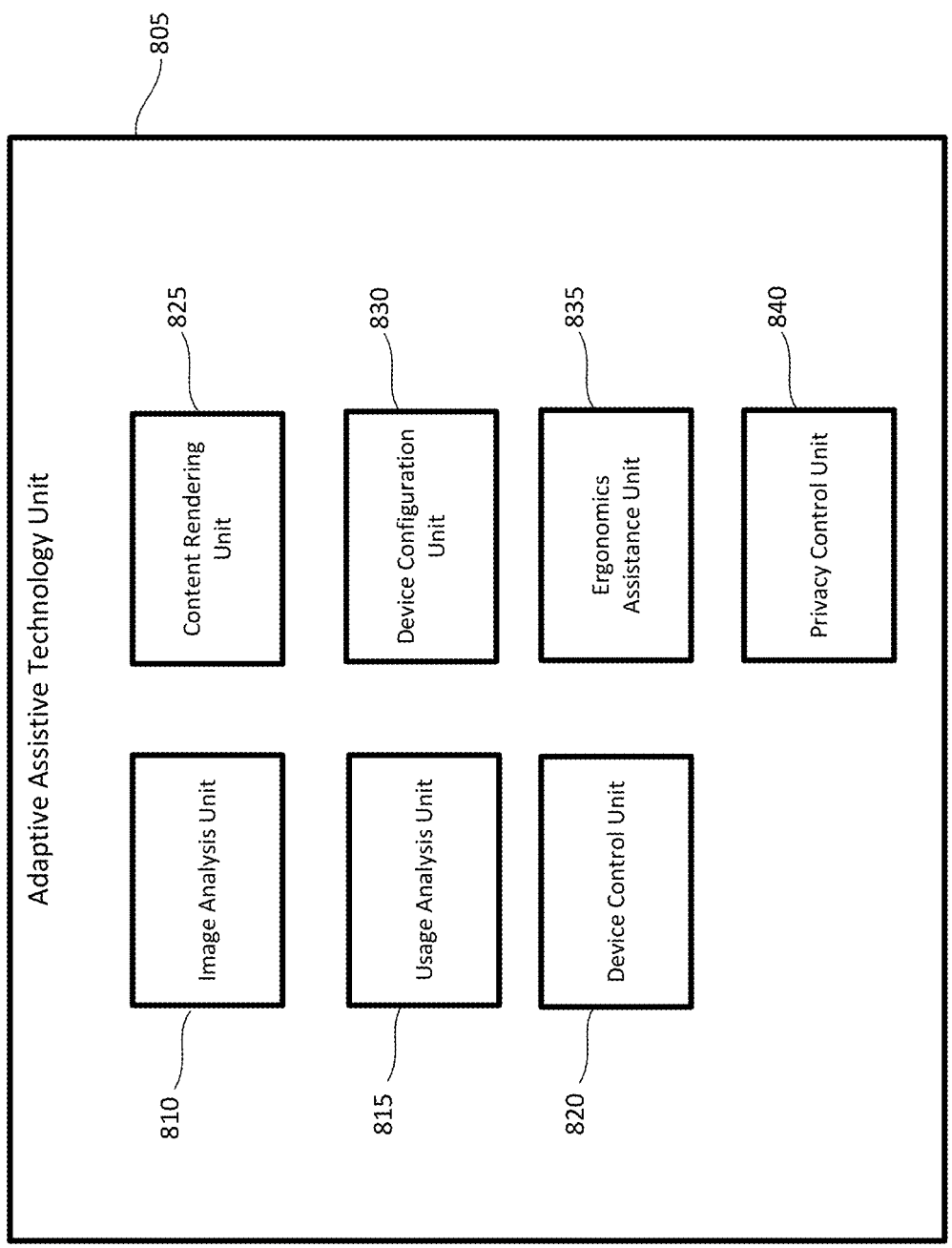
FIG. 8 is a functional block diagram of an example adaptive assistive technology unit on which the adaptive assistive technology techniques disclosed herein may be implemented.

FIG. 8 is a functional block diagram of an adaptive assistive technology unit (AATU) 805 that can be implemented on the computing devices from the preceding examples. While the examples of the AATU 805 are discussed with respect to computing device 105, the AATU 805 may also be implemented on the computing device 205. The AATU 805 can comprise processor-executable program code stored in a tangible computer-readable medium of the computing device.

The AATU 805 may determine that a user of the computing device may be experiencing visual impairment, auditory impairment, mobility impairment, or other issues for which assistive technologies may be provided by the computing device to facilitate using the computing device 105. In the preceding example, the magnifier unit 305 is configured to detect signals in the behavior or characteristics of a user of the computing device that are indicative of visual impairment and to provide adaptive solutions that can assist the user in viewing content of the display of the computing device. The AATU 805 goes beyond the magnifier provided by the magnifier unit 305 by providing means for identifying signals indicative of visual impairment, auditory impairment, mobility impairment, or other issues that may make using the computing device 105 or 205 more difficult, and by providing solutions to these issues. In some implementations, the functionality of the magnifier unit 305 may be implemented by the AATU 805. In other implementations, a computing system may include both the magnifier unit 305 and the AATU 805.

The AATU 805 may include an image analysis unit 810. The image analysis unit 810 may operate similarly to the image analysis unit 310 of the magnifier unit 305. The image analysis unit 810 may receive images and/or video content from the camera 120 of the computing device 105 and analyze the images and/or video to detect the head and/or eyes of the user.

The AATU 805 may include a usage analysis unit 815. The usage analysis unit 815 can analyze how the user is interacting with the computing device to determine whether the user interactions are indicative of the user experiencing difficulty using the computing device in a way which may be remedied by adaptive assistive technology. The example use cases that follow illustrate how the AATU 805 may determine that the user is experiencing difficulties using the computing device in a way which may be remedied using adaptive assistive technology.

The AATU 805 may include a device control unit 820 that may operate similarly as the device control unit 320 of the magnifier unit 305 discussed in the preceding examples. The device control unit 320 may be configured to control one or more devices associated with the computing device 105, and the device control unit 320 may control these devices to help reduce distractions from these devices that may interfere with the user's ability to concentrate and effectively utilize the computing device 105.

The AATU 805 may include a content rendering unit 825. The content rendering unit 825 may operate similarly to the content rendering unit 325 of the magnifier unit 330. The content rendering unit 825 can render assistive technology content on the display 110 of the computing device 85. The content rendering unit 825 may render content, such as the magnifier discussed in the preceding examples, and/or additional content discussed in the examples that follow that may assist the user with one or more aspects of the functionality of the computing device 105.

The AATU 805 may include a device configuration unit 830 which may operate similarly as the configuration unit 330 of the magnifier unit 305. The configuration unit 830 may configure one or more operating parameters of the magnifier and/or of the display 110 of the computing device 105.

The usage analysis unit 815 may be configured to recognize signals based on the user interaction with the computing device 105 that the user may be experiencing visual impairment, auditory impairment, mobility impairment, or other issues for which assistive technologies may be provided by the computing device to facilitate using the computing device 105. The AATU 805 may be configured by a provider of the AATU 805 to recognize a number of different signals. A signal indicative of a particular issue that the user may be experiencing may be associated with one or more actions that may be performed by the AATU 805 to try to assist the user in remedying that issue. The mapping between the signals and the one or more actions that may be performed may be stored in a memory of the computing device 105, and the AATU 805 can access the mapping information at the time that the AATU 805 is activated on the computing device 105.

The following use cases illustrate example signals that may be detected by the usage analysis unit 815 and examples of actions that may be performed in response to detecting such signals. These examples are intended to illustrate the concepts disclosed herein and are not intended to limit the adaptive assistive technology disclosed herein to these specific examples. The AATU 805 can be configured to recognize other signals and to perform actions in response to these signals in addition to or instead of one or more of the example signals discussed herein.

Usage analysis unit 815 can be configured to determine that the user may be experiencing visual impairment issues if the user zooms in on content, such as a webpage, email, document, or message by using the touch screen "pinch to zoom" feature or by selecting a "zoom in" option from a menu of the application in which the user is working, or by entering a keyboard command to increase the magnification of the content being displayed by the application. The user may be experiencing visual impairment that is interfering with the user's ability to use the computing device 105. The usage analysis unit 815 determine that the user may benefit from one or more of rendering the content on the display 110 using larger text and/or a larger pointer object (also referred to as a "mouse pointer"). The usage analysis unit 815 can be configured to address this issue in several different ways. In some implementations, the usage analysis unit 815 may automatically adjust the font size and/or the pointer size automatically. In other implementations, the usage analysis unit 815 may present the user with a user interface, using the content rendering unit 825, that proposes increasing the font size and/or the pointer size. The user interface may present a preview of increased font size and/or pointer size. The user interface may also include controls that allow the user to adjust the font size and/or pointer size manually. The user may accept the changes to the font size and/or the pointer size, and the AATU 805 may update the font size and/or pointer size at the operating system level, the application level, or both by modifying display settings associated with these components of the computing device 105. The user may also choose not to update the font size and/or pointer size, and the AATU 805 may at least temporarily suppress checking for this particular type of signal.

Usage analysis unit 815 can be configured to determine that the user may be experiencing visual impairment issues in response to detecting that the user is squinting. As discussed above with respect to the magnifier component, the image analysis unit 810 can be configured to analyze images and/or video of the user captured using a camera 120 associated with the computing device 105. These images can be analyzed using at least the techniques discussed in the preceding examples to determine that the user is squinting. The usage analysis unit 815 may determine that larger text and rendering the graphical user interface components in dark mode may assist the user in response to squinting. The usage analysis unit 815 may automatically make these changes to the configuration of the computing device 105 or may present a user interface to the user that proposes making the changes. The user interface may allow the user to adjust the font size manually. If the user accepts the proposed changes, the AATU 805 may update these parameters at the operating system level, the application level, or both, by modifying display settings associated with the font size and the display mode. The usage analysis unit 815 may also send a signal to the device control unit 820 to instruct the device control unit 820 to dim ambient lighting in the area surrounding the computing device 105 in response to the detecting that the user is squinting. As discussed in the preceding examples, the computing device 105 may be configured to control one or more IoT devices proximate to the computing device 105, and the AATU 805 can reduce ambient lighting to reduce glare on the display device and to reduce eye strain for users who experience light sensitivity.

The usage analysis unit 815 may also be configured to recognize that the user typically wears glasses but is not currently wearing glasses, as discussed above with respect to the magnifier unit 305. The usage analysis unit 815 can be configured to determine that increasing the font size and/or changing the resolution of the screen to a higher resolution where possible may assist the user in viewing content on the display of the computing device. The usage analysis unit 815 may automatically make these changes to the configuration of the computing device 105 or may present a user interface to the user that proposes making the changes as in the preceding examples.

The usage analysis unit 815 may also be configured to recognize that the user is close to the display 110 of the computing device 105 as discussed above with respect to the magnifier unit 305. The usage analysis unit 815 may determine that the magnifier should be rendered on the display 110 of the user device to assist the user in viewing the contents of the display 110.

The usage analysis unit 815 may determine that the user has turned the volume for the audio output by the computing device 105 above a predetermined threshold or to a maximum level, which may indicate that the user is experiencing auditory problems. The usage analysis unit 815 may enable closed captioning to assist the user in understanding the audio output. The usage analysis unit 815 may enable closed captioning at the operating system level, the application level, or both, by modifying display settings associated with the font size and the display mode. The usage analysis unit 815 may provide a user interface for configuring one or more parameters of the closed captioning, such as font size, font color, background color, location on the display for the closed captioning, and other parameters. The closed captions may in some implementations be available in more than one language, and the user interface may allow the user to select a language in which the closed captions may be displayed. The AATU 805 may also turn down or mute the volume of one or more applications on the computing device 105 or of one or more nearby devices with audio output in response to enabling closed captioning. The AATU 805 may determine which application the user is currently focused on using head and/or eye tracking techniques, such as those discussed in the preceding examples, to determine an application on which the user is currently focused, and to mute audio output from other applications based on the determination that the user is focused on a particular application.

The AATU 805 may be configured to receive audio input from a microphone of the computing device 805 and to analyze the audio input to determine whether the user is in a loud environment where it may be difficult to hear audio output of the computing device 105. For example, the user may be using a laptop, tablet, or mobile phone in a noisy restaurant, airport, train station, or other environment where there is a lot of background noise. The AATU 805 can automatically enable closed captioning on the computing device 105 in response to detecting that the user is using the computing device 105 in a loud environment. The AATU 805 may display a user interface, as discussed above, asking the user whether the user would like to enable closed captioning and explaining how the closed captioning feature works.

The usage analysis unit 815 may determine that the user may have auditory problems and the user may only be able to hear with one ear or primarily hears with only one ear. The usage analysis unit 815 may be able to determine that a user favors one ear over the other. In implementation where the computing device 105 is a smart phone or other similar communication device, the usage analysis unit 815 can determine which ear the user typically holds the device up to when conducting a call or listening to audio content. The usage analysis unit 815 may also monitor whether the user has adjusted the left and right audio balance on the audio output of the computing device. In response to an indication that the user may have problems hearing from one ear, the AATU 805 may display a user interface, as discussed above, asking the user whether the user would like to enable closed captioning and explaining how the closed captioning feature works and/or may ask the user whether they would wish to switch from stereo sound to mono sound. Stereo sound includes left and right channel information, and some information may be lost if the user cannot hear using one of their ears. Switching to mono sound causes both the left and right channel information to be routed to both the left and right speaker and/or headphone.

The usage analysis unit 815 may be configured to monitor keyboard inputs to determine whether the user may have a mobility issue that makes typing difficult. The usage analysis unit 815 may recognize that user's typing exhibits more than a threshold number of accidental key presses. Accidental key presses may be identified when the user backspaces over or deletes keyboard inputs. The usage analysis unit 815 may be configured to recognize partial word inputs, which help to disambiguate accidental keypresses from deliberate word choice decisions. Another example signal that may be used by the usage analysis unit 815 to determine whether the user may have a mobility issue that makes typing difficult is the frequency with which the application or operating system's auto-correct feature activates while the user is typing.

Repeated deletions may indicate that the user is having difficulties with the keyboard input and may benefit from one or more keyboard accessibility options. The operating system of the computing device 105 may provide one or more accessibility options that can assist a user having difficulties with keyboard inputs, such as a sticky keys mode, a filter keys mode, and a toggle keys mode. The sticky keys mode serializes keystrokes instead of requiring users to press multiple keys at the same time. The filter keys mode is configured to ignore brief or repeated keystrokes indicative of accidental keypresses. The toggle keys mode provides an audible signal and/or visible signal on the screen when certain special function keys, such as the caps lock key, the num lock key, or the scroll lock key are pressed. The usage analysis unit 815 may automatically turn on one or more keyboard accessibility option or present a user with a user interface explaining these features and providing the user with the ability active these features as in the preceding examples. The usage analysis unit 815 may also be configured to detect that the user is using a single hand to input by analyzing images or video of the user captured by a camera of the computing device and may be configured to automatically turn on one or more keyboard accessibility option or present a user with the user interface explaining these features and providing the user with the ability active these features as in the preceding examples.

As discussed above with respect to the magnifier unit 305, some implementations of the computing device may include a dedicated tracking device that is separate from the camera or cameras of the computing device. In such implementations, all or part of the head position and/or image tracking discussed above may be performed by the dedicated tracking device. In such implementations, all or part of the head position and/or image tracking performed by the image analysis unit 810 may be performed by the dedicated tracking device. The dedicated tracking device may be integrated with the computing device or may be connected to the computing device via a wired or wireless connection. The dedicated tracking device may be configured to output head position and/or tracking information that can be used by the various units comprising the AATU 805 similarly to the output from the head-pose estimation neural network discussed above. The dedicated tracking device may include one or more cameras for capturing images and/or video of the user of the computing device. The dedicated tracking device may include a processor, a memory, and/or other hardware and/or software components for performing the head-pose estimation and/or eye-tracking. The dedicated tracking device may, in some implementations, include one or more emitters that are configured to emit infrared (IR) and/or other wavelengths of light outside of the range of wavelengths typically visible to the human eye so as not interfere with the user's vision. The output of the dedicated tracking device may be provided to one or more of the modules of the magnifier unit 305 and/or the AATU 305 to provide head position and/or eye tracking information that may be used to control one or more aspect of the magnifier and/or one or more of the assistive technologies provided by the AATU 805.

The preceding examples illustrate situations where the AATU 805 may detect situations where a user may be benefit from assistive technology and can prompt the user to enable various assistive technology features. This approach does not require that the user have advanced training on the assistive technology provided the computing device 105 nor does it require the user to seek out and discover the assistive technologies provided to the user. Instead, the AATU 805 provides an adaptive approach to providing assistive technology by detecting certain signals in user behavior and/or environmental conditions that indicate that a particular adaptive technology may improve the user experience of the user of the computing device 105.

The AATU 805 may be configured to provide a personalized Out of Box Experience ("OOBE") for a user. The OOBE is the experience that a user has when preparing for the first use of a new product. The OOBE may take place when the user purchases a new computing device, such as laptop, desktop computer, tablet computer, smart phone, smart watch or other wearable computing device, or other computing device, and boots up the device for the first time. The OOBE may also take place in the context of the user installing a new or updated operating system on their computing device. In both situations, the operating system of the computing device may be configured to present the user with a user interface for personalizing the configuration of various parameters of the computing device, the operating system, or both. The AATU 805 may be configured to provide at least a portion of the adaptive assistive technologies discussed in the preceding examples to the OOBE. The AATU 805 may be executed in the background during the OOBE process, and may recognize signals such but not limited to squinting, user proximity to the display of the computing device, typing patterns, turning up audio volume levels beyond a predetermined threshold, and other signals that indicate that the user may benefit from one or more of the assistive technologies provided by the computing device. The OOBE process may also include collecting demographic information about the user, including date of birth information or an age range of the user. The OOBE may utilize this information to determine whether to present the user with certain assistive technologies, such as but not limited to increased font size and/or pointer size.

The following examples illustrate how the AATU 805 may be integrated into the OOBE experience. In a first example, a first user is determined to be 21 years old based on the demographic information obtained during the OOBE process. The AATU 805 detects that the user is not positioned close to the display by analyzing images and/or video of the user captured by a camera of the computing device. Accordingly, the AATU 805 may determine that the user does not appear to require assistive technologies, such as the magnifier or the increased font size and does not present any assistive technologies to the user during the OOBE experience. In a second example, a second user is determined to be 55 years old and is determined to be wearing glasses based on images and/or video of the second user captured by a camera of the computing device and analyzed by the AATU 805. The AATU 805 may present the user with one or more adaptive assistive technologies that may assist users with visual impairments, such as increasing the font size, the magnifier, and/or other assistive technologies that may facilitate reading the content displayed on the display of the computing device. In a third example, a third user has not provided age-related demographic information, but the user is determined to be within a predetermine threshold of the display of the computing device for more than a predetermined period of time and/or more than a predetermined number of times. Where no age-related demographic information is available, the AATU 805 may attempt to estimate the user's age using computer vision techniques. The AATU 805 may activate the magnification unit 305 and present the user with one or more visual adaptive technologies available on the computing device 105. These examples illustrate how the AATU 805 may identify signals that indicate that the user may benefit from adaptive technologies during the OOBE.

The techniques disclosed herein are not limited to these specific signals and specific examples.

The AATU 805 may also be adapted to provide an opportunity for new users of a previously configured computing device to be presented with assistive technologies available to the user on the computing device. For example, when a new user account is added to an existing Microsoft Windows computing device, the user is presented with a user interface referred to as a "Windows Welcome Experience" which presents the user with information regarding various features of the operating system and provides the user with an opportunity to personalize various features of the computing device and the operating system when that user logs into their account on the computing device. Other operating systems may provide similar user interfaces for new users to personalize the configuration of the computing device and/or operating system, and the AATU 805 may be configured for use with these operating systems. The welcome user interface may present the user with various adaptive technologies available on the computing device as part of the process of presenting the user with options for configuring the operating system and/or computing device. The AATU 805 may also be executed in the background while the welcome user interface is executing, and the AATU 805 may recognize signals that indicate the user may benefit from one or more assistive technologies and present those adaptive technologies to the user.

The AATU 805 may also include an ergonomics assistance unit 835. The ergonomics assistance unit can be configured to assist the user in positioning themselves in an ergonomic position when using the computing device. The ergonomics assistance unit 835 feature may be provided to the user as a menu item from the start menu, included in the OOBE or welcome experience presented to the user, or the AATU 805 may periodically check the posture of the user using the camera of the computing device. The image analysis unit 810 may be configured to analyze photos and/or video of the user captured using a camera of the computing device to determine posture information for the user. The image analysis unit 810 may be configured to recognize the position of the user's head and body relative to the computing device 105. The image analysis unit 810 may use a head-pose estimation neural network to produce information that can be used to track head and/or eye movements of the user or head position and/or eye tracking position may be provided by a dedicated tracking device. In some implementations, the ergonomics assistance unit 835 may be configured to walk the user through a configuration process in which the ergonomics assistance unit 835 requests that the user perform a series of poses so that the ergonomics assistance unit 835 can calibrate the body pose estimation neural network. The AATU 805 may be configured with a body pose estimation neural network that is trained to analyze images and/or video content of a user and to provide head and body position information based on the analyzed images and/or video content. The ergonomics assistance unit 835 can determine that the user is positioned in non-ergonomic position based on the head and body information provided by the body pose estimation neural network. The ergonomics assistance unit 835 may display an ergonomics assistance user interface on a display of the computing device using the content rendering unit 825 that can present ergonomics information to the user and provide suggestions to the user how to adjust their head and/or body position to a more ergonomic position. The ergonomics assistance unit 835 may be configured to provide real-time feedback to the user as the user adjusts their head and/or body position.

The AATU 805 may be configured to provide assistive technology to users of a computing device based on situational needs rather than accessibility needs of a user that have been identified by the AATU 805. The AATU 805 can be configured to monitor aspects of the environment in which the computing device is deployed as well as aspects of the configuration of the computing device itself to determine whether any of the adaptive technologies available on the computing device may address situational needs identified by the AATU 805. With respect to auditory situational needs, the AATU 805 may detect that the computing device is in a loud environment and may automatically turn on closed captioning. For example, the computing device may be smart television or other device configured to display audiovisual content located in an airport, bar, restaurant, stadium, or other location where the ambient noise levels may prevent the audio output of the device from being heard. With respect to visual situation needs, the AATU 805 may detect that the computing device is in an area with bright ambient lighting conditions or in bright sunlight which may interfere with viewing of the contents rendered on the display of the computing device. The AATU 805 may automatically increase the brightness of the screen and make other changes to the display characteristics, such as selecting font and background colors that provide high contrast to provide high visibility. With respect to user mobility and interactivity needs, the AATU 805 may detect that the computing device 105 has limited user interface options and may activate a voice command capability of the computing device 105. For example, the computing device may be a kiosk, such as that illustrated in FIG. 2B, or another touchscreen device that lacks a keyboard and/or mouse input. The AATU 805 may activate voice command capabilities to provide the user with another means for interacting with the computing device. The preceding examples illustrates situations where the AATU 805 may automatically initiate assistive technologies of the operating system and/or the computing device based on situational needs. The techniques disclosed herein are not limited to these specific examples, and the AATU 805 may be configured to adapt to other types of situational needs.

The AATU 805 may also be configured to perform other assistive tasks beyond the assistive technologies described in the preceding examples. For example, the AATU 805 may be configured to monitor for user presence proximate to the computing device 805 using images and/or video captured by the camera of the computing device. The AATU 805 may be configured to automatically blank the contents of the display and/or to lock the computing device if the user is determined to no longer be proximate to the computing device. The length of time before the screen contents are blanked out and/or the computing device 105 is locked may be configurable by the user of the device. In enterprise environments, an administrator may define the parameters for how the user is absent from the device before the contents of the screen are blanked out and/or the computing device is locked.

The AATU 805 may also be configured to provide privacy safeguards for users of the device. The image analysis unit 810 may be configured to detect multiple people within the field of view of the camera of the computing device and to send a signal to the privacy control unit 840. The privacy control unit 840 may be configured to determine a context of the current usage of the computing device 105 and to determine whether a privacy issue has occurred. The privacy control unit 840 may consider one or more of the following factors when determining whether a privacy violation has occurred: (1) whether the user is accessing sensitive information, (2) whether the user appears to be collaborating with the other person detected within the field of view of the camera, and (3) the direction of gaze of the other person. The privacy control unit 840 may obtain head position and/or eye tracking information from the image analysis unit 810 for the other user if the camera fidelity, lighting conditions, and the other user's proximity to the camera provide sufficient detail for the image analysis unit 810 to determine this information. The privacy control unit 840 may also determine whether the user is accessing sensitive information at the time that the other person appears within the field of view of the camera. If the user is playing a game or performing some other task where there are no privacy concerns, then the privacy control unit 840 may ignore the presence of the other user. However, if the user is accessing potentially sensitive information, the privacy control unit 840 may take one or more actions to protect the privacy of the user.

The privacy control unit 840 may be configured determine that the user is accessing potentially sensitive information based on an application or website that the user is accessing. The application or website may access financial information, medical information, tax information, email or text messages, or other potentially sensitive information. The privacy control unit 840 may be configured to determine whether the computing device is connected to an enterprise intranet from which the user may be accessing sensitive corporate information.

The privacy control unit 840 may determine whether the user may be collaborating with the other person detected by the image analysis unit 810, and thus, the presence of the second user is not a privacy violation. The position of the user relative to the other person in the field of view of the camera may be indicative of collaboration between the user and the other person. For example, if the user is positioned side by side with the other user, the privacy control unit 840 may determine that the user is collaborating with the other user. However, if the other user is positioned behind the user by more than a predetermined distance, the privacy control unit 840 may determine that the user is not collaborating with the other user. Furthermore, the privacy control unit 840 may be configured to determine whether a person positioned behind the user is directing their gaze toward the display of the computing device or elsewhere. The presence of someone behind the user whose gaze is not directed toward the display of the computing device may be determined to not be a privacy threat. The sensitivity of the privacy control unit 840 may differ depending upon the type of implementation. For example, an automated teller machine may alert the user to the presence of anyone directly behind the user, while mobile phone may not be concerned with the presence of someone behind the user unless the user is accessing sensitive data on the device.

The privacy control unit 840 may signal the device configuration unit 830 to perform one or more actions responsive to determining that the presence of another person is a privacy threat. The privacy control unit 840 may blank the contents of the screen, lock the screen, issue a privacy alert to the user, minimize all application that are currently open, or other actions to minimize the privacy threat. The privacy alert may include an audible, haptic, and/or visible privacy alert to the user. The visible privacy alert may include a graphical user interface that overlays all or a portion of the display of the computing device to hide potentially sensitive information. The user may dismiss the privacy alert if they do not agree with the assessment made by the privacy control unit 840 or may take other action to secure the sensitive data.

In some implementations, the head tracking and/or eye tracking provided by the image analysis unit 310 of the magnifier component 305 and the device control capabilities of the device control unit 315 and/or by the image analysis unit 810 and the device control unit 815 of the AATU 805 may be implemented as a separate tracking and control unit that provides an API that other applications may use to implement head and/or eye tracking controls for that application. For example, a video game application may implement head tracking and/or eye tracking to provide an immersive user experience. Other types of applications may also utilize the head and/or eye tracking functionality, such as mapping or navigation applications, may allow the user to navigate through an environment using head and/or eye movements. A painting program may allow a user to control a brush strokes using head and/or eye movements. A 3D modeling program may allow a user to manipulate 3D models using head and/or eye movements. These examples illustrate a few of the types of applications that may benefit from the head and/or eye tracking interface.

Figure 9:
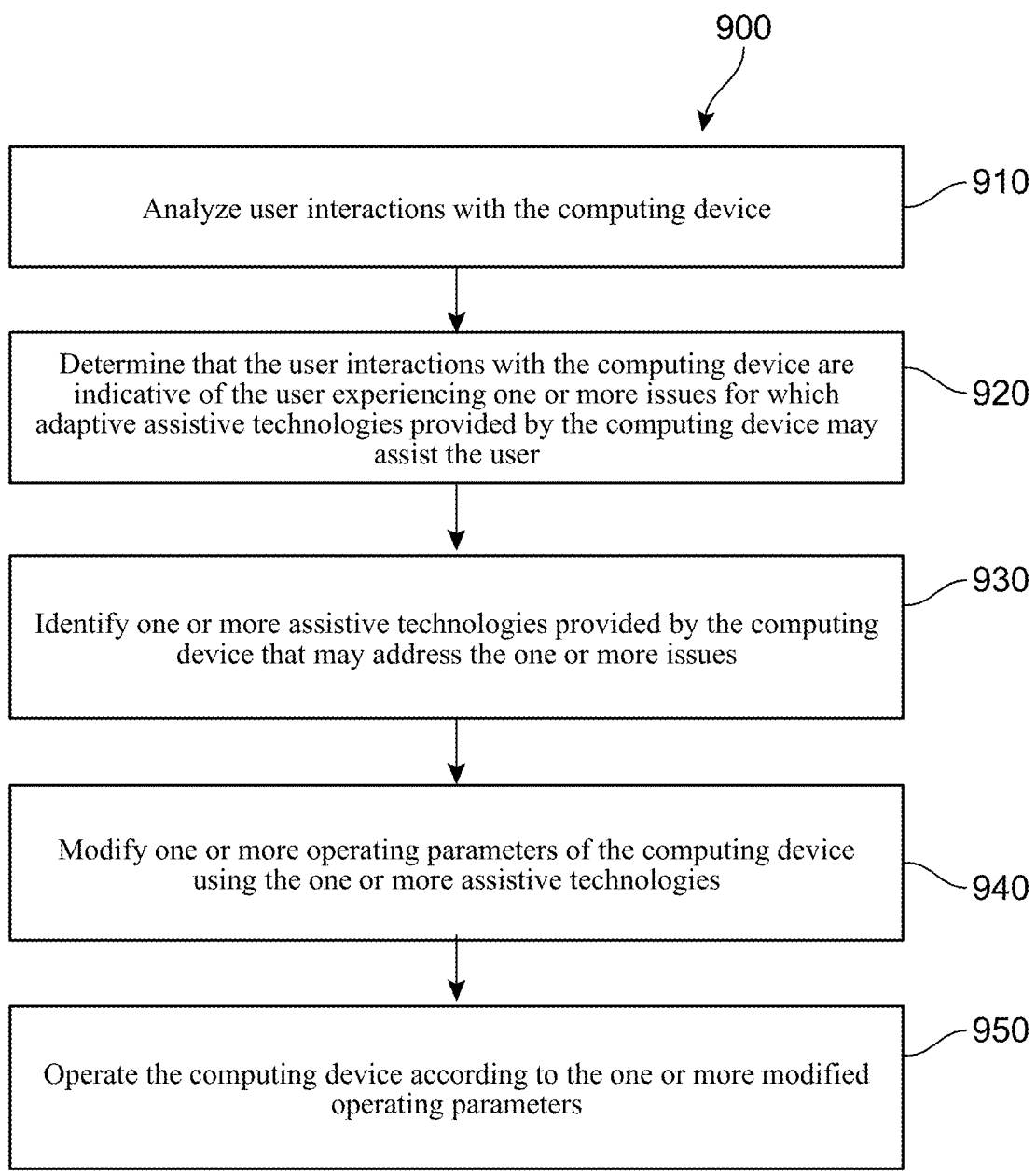
FIG. 9 presents a flowchart of an example process for providing assistive technologies on a computing device.

FIG. 9 illustrates a flow chart of an example process 900 for providing assistive technologies on a computing device. The process 900 refers to the computing device 105 but may also be implemented by the computing device 205 illustrated in the preceding examples. The process 900 may be implemented by the AATU 805.

The process 900 may include an operation 910 in which user actions with the computing device are analyzed. As discussed in the preceding examples, the image analysis unit 810 of the AATU 805 may analyze images and/or video content captured by a camera associated with the computing device and may determine head and/or eye tracking information, cognitive state information, posture information, and/or other information indicative of how the user is interacting with the computing device 105. The usage analysis unit 815 of the AATU 805 may also analyze how the user is interacting with computing device 105 to identify signals that may indicate that the user may be experiencing difficulty using the computing device 105.

The process 900 may include an operation 920 in which a determination is made that the user interactions with the computing device are indicative of the user experiencing one or more issues for which adaptive assistance technologies provided by the computing device 105 may assist the user address these issues. As discussed in the preceding examples, the AATU 805 can determine that the user is experiencing visual impairment, auditory impairment, mobility impairment, and/or other issues for which assistive technologies provided by the computing device 105 may be available. The AATU 805 may determine that situational issues exist that are not directly associated with user interactions with the computing device 105 for which adaptive assistive technologies may be useful.

The process 900 may include an operation 930 in which one or more assistive technologies provided by the computing device 105 that may address the one or more issues experienced by the user. The AATU 805 may select from the available assistive technologies on the computing device a set of one or more assistive technologies that may help remedy the issues that the user is experiencing.

The process 900 may include an operation 940 in which one or more operating parameters of the computing device may be modified using the one or more assistive technologies identified. The AATU 805 may configured various operating parameters of the computing device 105 as discussed in the preceding examples. These operating parameters may configure various aspects of the computing device 105 to adapt to visual impairment, auditory impairment, mobility impairment, and/or other issues that the user may be experiencing. The one or more operating parameters may be altered automatically by the AATU 805 or based on inputs received from the user of the computing device 105. Furthermore, the one or more operating parameters may be set based on situational issues that the AATU 805 identified.

The process 900 may include an operation 950 in which the computing device may be operated according to the one or more modified operating parameters. The computing device 105 can continue to operate using the personalized operating parameters for the user. The AATU 805 can continue to monitor the user interactions with the computing device 105 and may provide automatically launch and/or present additional adaptive assistance technologies to the user based on the user's continued interactions with the computing device 105.

The detailed examples of systems, devices, and techniques described in connection with FIGS. 1-9 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-9 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 10:
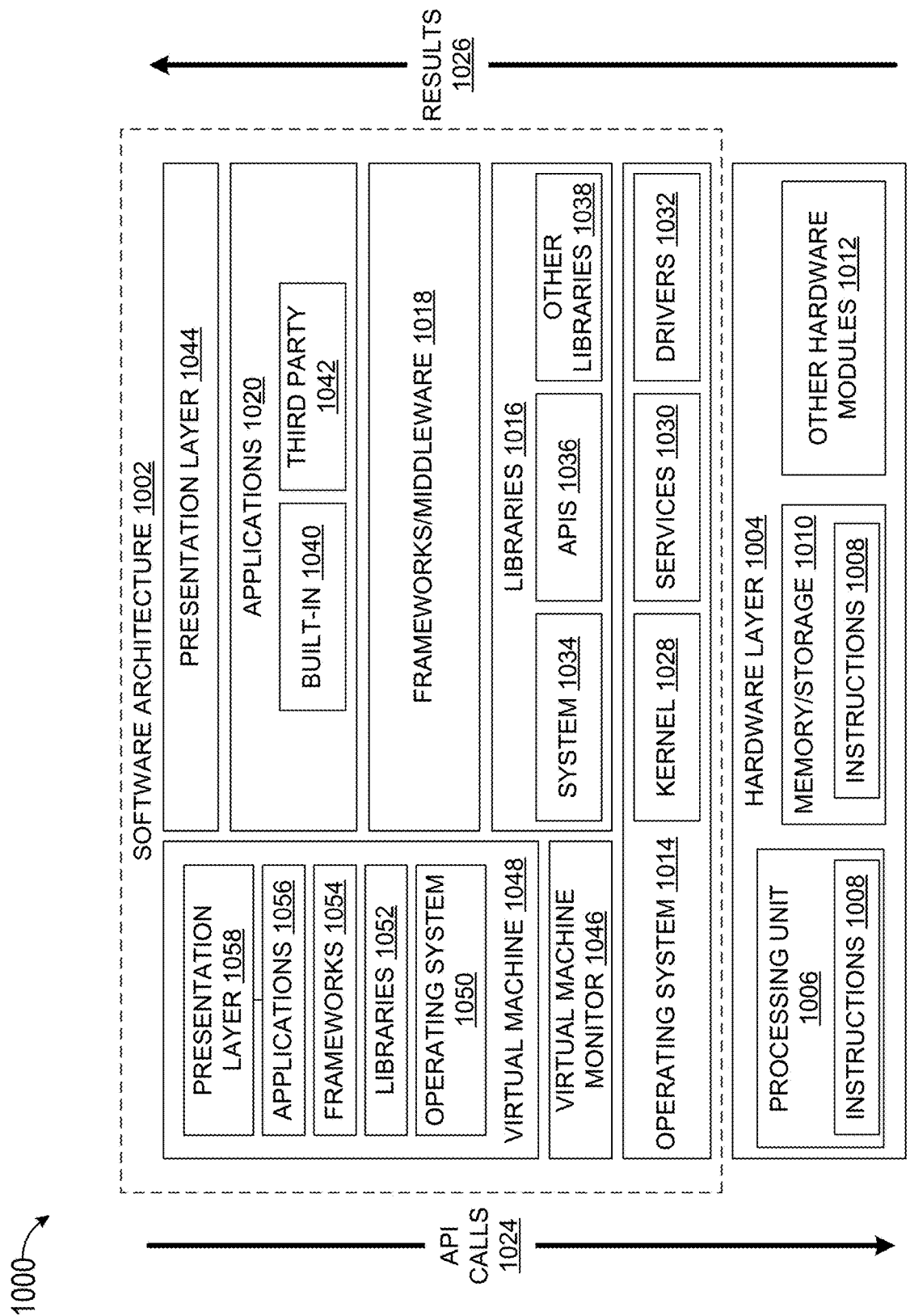
FIG. 10 is a block diagram illustrating an example software architecture, various portions of which may be used in conjunction with various hardware architectures herein described, which may implement any of the features herein described.

FIG. 10 is a block diagram 1000 illustrating an example software architecture 1002, various portions of which may be used in conjunction with various hardware architectures herein described, which may implement any of the above-described features. FIG. 10 is a non-limiting example of a software architecture and it will be appreciated that many other architectures may be implemented to facilitate the functionality described herein. The software architecture 1002 may execute on hardware such as a machine 1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 includes a processing unit 1006 and associated executable instructions 1008. The executable instructions 1008 represent executable instructions of the software architecture 1002, including implementation of the methods, modules and so forth described herein. The hardware layer 1004 also includes a memory/storage 1010, which also includes the executable instructions 1008 and accompanying data. The hardware layer 1004 may also include other hardware modules 1012. Instructions 1008 held by processing unit 1006 may be portions of instructions 1008 held by the memory/storage 1010.

The example software architecture 1002 may be conceptualized as layers, each providing various functionality. For example, the software architecture 1002 may include layers and components such as an operating system (OS) 1014, libraries 1016, frameworks 1018, applications 1020, and a presentation layer 1044. Operationally, the applications 1020 and/or other components within the layers may invoke API calls 1024 to other layers and receive corresponding results 1026. The layers illustrated are representative in nature and other software architectures may include additional or different layers. For example, some mobile or special purpose operating systems may not provide the frameworks/middleware 1018.

The OS 1014 may manage hardware resources and provide common services. The OS 1014 may include, for example, a kernel 1028, services 1030, and drivers 1032. The kernel 1028 may act as an abstraction layer between the hardware layer 1004 and other software layers. For example, the kernel 1028 may be responsible for memory management, processor management (for example, scheduling), component management, networking, security settings, and so on. The services 1030 may provide other common services for the other software layers. The drivers 1032 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1016 may provide a common infrastructure that may be used by the applications 1020 and/or other components and/or layers. The libraries 1016 typically provide functionality for use by other software modules to perform tasks, rather than rather than interacting directly with the OS 1014. The libraries 1016 may include system libraries 1034 (for example, C standard library) that may provide functions such as memory allocation, string manipulation, file operations. In addition, the libraries 1016 may include API libraries 1036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1038 to provide many functions for applications 1020 and other software modules.

The frameworks 1018 (also sometimes referred to as middleware) provide a higher-level common infrastructure that may be used by the applications 1020 and/or other software modules. For example, the frameworks 1018 may provide various graphic user interface (GUI) functions, high-level resource management, or high-level location services. The frameworks 1018 may provide a broad spectrum of other APIs for applications 1020 and/or other software modules.

The applications 1020 include built-in applications 1040 and/or third-party applications 1042. Examples of built-in applications 1040 may include, but are not limited to, a contacts application, a browser application, a location application, a media application, a messaging application, and/or a game application. Third-party applications 1042 may include any applications developed by an entity other than the vendor of the particular platform. The applications 1020 may use functions available via OS 1014, libraries 1016, frameworks 1018, and presentation layer 1044 to create user interfaces to interact with users.

Some software architectures use virtual machines, as illustrated by a virtual machine 1048. The virtual machine 1048 provides an execution environment where applications/modules can execute as if they were executing on a hardware machine (such as the machine 1000 of FIG. 10, for example). The virtual machine 1048 may be hosted by a host OS (for example, OS 1014) or hypervisor, and may have a virtual machine monitor 1046 which manages operation of the virtual machine 1048 and interoperation with the host operating system. A software architecture, which may be different from software architecture 1002 outside of the virtual machine, executes within the virtual machine 1048 such as an OS 1014, libraries 1052, frameworks 1054, applications 1056, and/or a presentation layer 1058.

Figure 11:
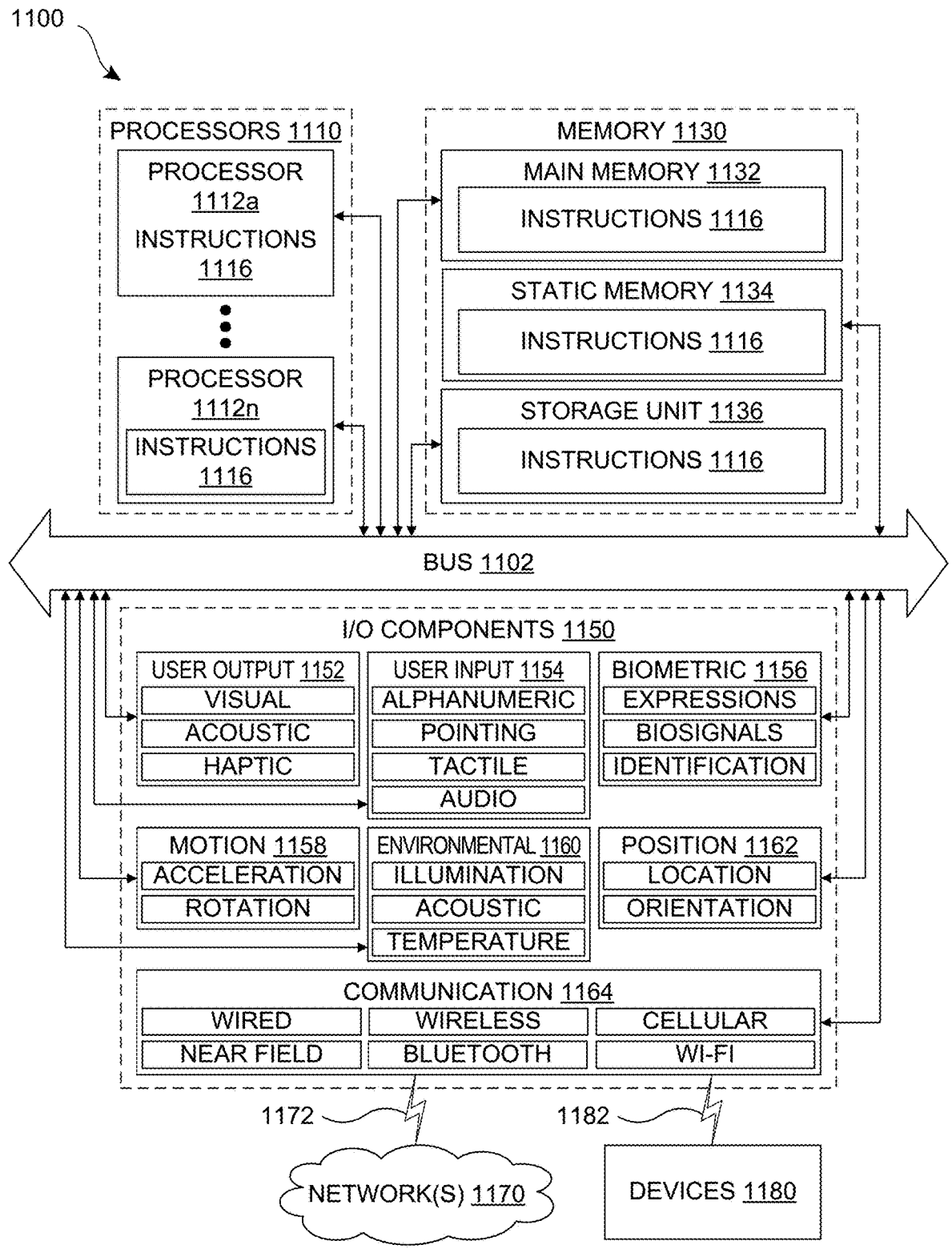
FIG. 11 is a block diagram illustrating components of an example machine configured to read instructions from a machine-readable medium and perform any of the features described herein.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term "machine" includes a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors 1112a to 1112n that may execute the instructions 1116 and process data. In some examples, one or more processors 1110 may execute instructions provided or identified by one or more other processors 1110. The term "processor" includes a multi-core processor including cores that may execute instructions contemporaneously. Although FIG. 11 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1116) for execution by a machine 1100 such that the instructions, when executed by one or more processors 1110 of the machine 1100, cause the machine 1100 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1150 may include biometric components 1156, motion components 1158, environmental components 1160, and/or position components 1162, among a wide array of other physical sensor components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1158 may include, for example, acceleration sensors (for example, an accelerometer) and rotation sensors (for example, a gyroscope). The environmental components 1160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1162, such as, but not limited to, geo-location via Internet Protocol (IP) address, location via Wi-Fi, cellular, NFC, Bluetooth, or other wireless station identification and/or signal triangulation.

In the following, further features, characteristics and advantages of the system and method will be described by means of items: Item 1. A computing device comprising: a processor; and a computer-readable medium storing executable instructions for causing the processor to perform operations comprising: displaying content on a display of the computing device; displaying content to a user; capturing a series of images of the user using a camera associated with the computing device; analyzing the series of images to determine whether the user is exhibiting behavior or characteristics indicative of a visual impairment; and rendering a magnification user interface on the display configured to magnify at least a portion of the content of the display based on a determination that the user is exhibiting behavior or characteristics indicative of visual impairment.

Item 2. The computing device of item 1, wherein the instructions for analyzing the series of images further comprise instructions to cause the processor to perform the operations comprising: detecting eyes of the user in the series of images; and determining that the user is squinting.

Item 3. The computing device of item 1, wherein the instructions for analyzing the series of images further comprise instructions to cause the processor to perform the operations comprising: determining a distance of the user from the display of the computing device based on the series of images; and determining that the user is within a first threshold distance from the display.

Item 4. The computing device of item 3, further comprising instructions configured to cause the processor to perform the operations of: determining a zoom level for magnified content displayed by the magnification user interface based on the distance of the user from the display; and rendering the magnified content based to the determined zoom level.

Item 5. The computing device of item 1, wherein the instructions for analyzing the series of images to determine whether the user is exhibiting behavior or characteristics indicative of visual impairment further comprise instructions to cause the processor to perform the operations comprising: determining a cognitive state of the user of the computing device; and determining that the user is exhibiting behavior or characteristics indicative of visual impairment response to the user exhibiting frustration or anger.

Item 6. The computing device of item 1, further comprising instructions configured to cause the processor to perform the operations of: tracking head movement, eye movement, or both of the user based on the series of images captured by the camera; and modifying one or more attributes of the magnification user interface based on the head movement, eye movement, or both.

Item 7. The computing device of item 6, wherein the instructions for modifying the one or more attributes of the user interface based on the head movement, eye movement, or both further comprise instructions configured to cause the processor to perform operations comprising: translating the head movement, eye movement, or both into movement of the portion of the content of the display that is magnified by the magnification user interface.

Item 8. The computing device of item 5, further comprising instructions configured to cause the processor to perform the operations of: determining that the user is reading magnified content based on the head movement, eye movement or both; and configuring the magnification user interface to pan laterally across the content in response to determining that the user is reading magnified content.

Item 9. A method for controlling a user interface of a computing device, the method comprising: displaying content on a display of the computing device; capturing a series of images of user of the computing device using a camera associated with the computing device; analyzing the series of images to determine whether the user is exhibiting behavior or characteristics indicative of visual impairment; and rendering a magnification user interface on the display configured to magnify at least a portion of the content of the display based on a determination that the user is exhibiting behavior or characteristics indicative of visual impairment.

Item 10. The method of item 9, wherein analyzing the series of images further comprises: detecting eyes of the user in the series of images; and determining that the user is squinting.

Item 11. The method of item 9, wherein analyzing the series of images further comprises: determining a distance of the user from the display of the computing device based on the series of images; and determining that the user is within a first threshold distance from the display.

Item 12. The method of item 11, further comprising: determining a zoom level for magnified content displayed by the magnification user interface based on the distance of the user from the display; and rendering the magnified content based to the determined zoom level.

Item 13. The method of item 9, further comprising: tracking head movement, eye movement, or both of the user based on the series of images captured by the camera; and modifying one or more attributes of the magnification user interface based on the head movement, eye movement, or both.

Item 14. The method of item 13, wherein modifying the one or more attributes of the user interface based on the head movement, eye movement, or both further comprises: translating the head movement, eye movement, or both into movement of the portion of the content of the display that is magnified by the magnification user interface.

Item 15. A memory device storing instructions that, when executed on a processor of a computing device, cause the computing device to render a magnification user interface, by: displaying content to a user; capturing a series of images of the user; analyzing the series of images to determine whether the user is exhibiting behavior or characteristics indicative of visual impairment; and rendering a magnification user interface on the display configured to magnify at least a portion of the content of the display based on a determination that the user is exhibiting behavior or characteristics indicative of visual impairment.

Item 16. The memory device of item 15, wherein the instructions for analyzing the series of images further comprise instructions for causing the computing device to perform the operations of: detecting eyes of the user in the series of images; and determining that the user is squinting.

Item 17. The memory device of item 15, wherein the instructions for analyzing the series of images further comprise instructions for causing the computing device to perform the operations of: determining a distance of the user from the display of the computing device based on the series of images; and determining that the user is within a first threshold distance from the display.

Item 18. The memory device of item 17, further comprising instructions configured to cause the computing device to perform the operations of: determining a zoom level for magnified content displayed by the magnification user interface based on the distance of the user from the display; and rendering the magnified content based to the determined zoom level.

Item 19. The memory device of item 17, further comprising instructions configured to cause the computing device to perform the operations of: tracking head movement, eye movement, or both of the user based on the series of images captured by the camera; and modifying one or more attributes of the magnification user interface based on the head movement, eye movement, or both.

Item 20. The memory device of item 19, wherein modifying the one or more attributes of the user interface based on the head movement, eye movement, or both further comprises: translating the head movement, eye movement, or both into movement of the portion of the content of the display that is magnified by the magnification user interface.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A computing device comprising:
   a processor; and
   a computer-readable medium storing executable instructions for causing the processor to perform operations comprising:
   displaying content on a display of the computing device;
   capturing a series of images of a user using a camera associated with the computing device;
   analyzing the series of images to determine whether the user is exhibiting behavior indicative of a visual impairment by detecting eyes of the user in the series of images and determining that the user is squinting by detecting changes in an aspect ratio of a shape of the user's eyes, wherein detecting changes in the aspect ratio includes determining whether a ratio of a width of an eye opening to a height of the eye opening exceeds a predetermined threshold;
   rendering a magnification user interface on the display configured to magnify at least a portion of the content of the display based on a determination that the user is exhibiting behavior indicative of visual impairment;
   tracking movement of the user based on the series of images captured by the camera by providing the series of images as an input to a neural network configured to estimate a position of a user's head and to generate first bounding box information representing a first bounding box around a predicted position of the user's head;
   estimating a distance of the user from the display of the computing device based on a size of the first bounding box; and
   modifying one or more attributes of the magnification user interface based on the distance of the user from the display.

2. The computing device of claim 1, wherein the instructions for analyzing the series of images further comprise instructions to cause the processor to perform the operations comprising:
  determining that the user is within a first threshold distance from the display.

3. The computing device of claim 2, further comprising instructions configured to cause the processor to perform the operations of:
  determining a zoom level for magnified content displayed by the magnification user interface based on the distance of the user from the display; and
  rendering the magnified content based to the determined zoom level.

4. The computing device of claim 1, wherein the instructions for analyzing the series of images to determine whether the user is exhibiting behavior indicative of visual impairment further comprise instructions to cause the processor to perform the operations comprising:
  determining a cognitive state of the user of the computing device;
  determining that the user is exhibiting frustration or anger based on the cognitive state of the user of the computing device; and
  determining that the user is exhibiting behavior indicative of visual impairment in response to the user exhibiting frustration or anger.

5. The computing device of claim 1, wherein the tracking movement of the user includes tracking head movement, eye movement, or both of the user, wherein the first bounding box information is updated based on the head movement of the user and wherein tracking the head movement includes tracking changes in position of the first bounding box.

6. The computing device of claim 5, further comprising instructions configured to cause the processor to perform the operations of:
  translating the head movement, eye movement, or both into movement of the portion of the content of the display that is magnified by the magnification user interface.

7. A computing device comprising:
  a processor; and
  a computer-readable medium storing executable instructions for causing the processor to perform operations comprising:
    displaying content on a display of the computing device;
    capturing a series of images of a user using a camera associated with the computing device;
    analyzing the series of images to determine whether the user is exhibiting behavior indicative of a visual impairment by detecting eyes of the user in the series of images;
    rendering a magnification user interface on the display configured to magnify at least a portion of the content of the display based on a determination that the user is exhibiting behavior indicative of visual impairment;
    tracking head movement, eye movement, or both of the user based on the series of images captured by the camera;
    determining that the user is reading magnified content based on the head movement, eye movement or both;
    responsive to determining that the user is reading magnified content, configuring the magnification user interface to pan laterally across the content and to prevent vertical panning of the magnification user interface across the content;
    determining that the user has reached an end of a line of the content; and
    configuring the magnification user interface to permit vertical panning of the magnification user interface across the content responsive to determining that the user has reached the end of the line of the content.

8. A method for controlling a user interface of a computing device, the method comprising:
  displaying content on a display of the computing device;
  capturing a series of images of a user of the computing device using a camera associated with the computing device;
  analyzing the series of images to determine whether the user is exhibiting behavior indicative of visual impairment by detecting eyes of the user in the series of images and determining that the user is squinting by detecting changes in an aspect ratio of a shape of the user's eyes, wherein detecting changes in the aspect ratio includes determining whether a ratio of a width of an eye opening to a height of the eye opening exceeds a predetermined threshold;
  rendering a magnification user interface on the display configured to magnify at least a portion of the content of the display based on a determination that the user is exhibiting behavior indicative of visual impairment;
  tracking movement of the user based on the series of images captured by the camera by providing the series of images as an input to a neural network configured to estimate a position of a user's head and to generate first bounding box information representing a first bounding box around a predicted position of the user's head;
  estimating a distance of the user from the display of the computing device based on a size of the first bounding box; and
  modifying one or more attributes of the magnification user interface based on the distance of the user from the display.

9. The method of claim 8, wherein analyzing the series of images further comprises:
  determining that the user is within a first threshold distance from the display.

10. The method of claim 9, further comprising:
  determining a zoom level for magnified content displayed by the magnification user interface based on the distance of the user from the display; and
  rendering the magnified content based to the determined zoom level.

11. The method of claim 8, wherein the tracking movement of the user includes tracking head movement, eye movement, or both of the user wherein the first bounding box information is updated based on the head movement of the user, and wherein tracking the head movement includes tracking changes in position of the first bounding box.

12. The method of claim 11, further comprising:
  translating the head movement, eye movement, or both into movement of the portion of the content of the display that is magnified by the magnification user interface.

13. A memory device storing instructions that, when executed on a processor of a computing device, cause the computing device to render a magnification user interface, by:
  displaying content to a user on a display of the computing device;
  capturing a series of images of the user using a camera;

analyzing the series of images to determine whether the user is exhibiting behavior indicative of visual impairment by detecting eyes of the user in the series of images and determining that the user is squinting by detecting changes in an aspect ratio of a shape of the user's eyes, wherein detecting changes in the aspect ratio includes determining whether a ratio of a width of an eye opening to a height of the eye opening exceeds a predetermined threshold;

rendering a magnification user interface on the display configured to magnify at least a portion of the content of the display based on a determination that the user is exhibiting behavior indicative of visual impairment;

tracking movement of the user based on the series of images captured by the camera by providing the series of images as an input to a neural network configured to estimate a position of a user's head and to generate first bounding box information representing a first bounding box around a predicted position of the user's head;

estimating a distance of the user from the display of the computing device based on a size of the first bounding box; and modifying one or more attributes of the magnification user interface based on the distance of the user from the display.

14. The memory device of claim 13, wherein the instructions for analyzing the series of images further comprise instructions for causing the computing device to perform the operations of:
determining that the user is within a first threshold distance from the display.

15. The memory device of claim 14, further comprising instructions configured to cause the computing device to perform the operations of:
determining a zoom level for magnified content displayed by the magnification user interface based on the distance of the user from the display; and
rendering the magnified content based to the determined zoom level.

16. The memory device of claim 14, wherein the tracking movement of the user includes tracking head movement, eye movement, or both of the user, and wherein tracking the head movement includes tracking changes in position of the first bounding box.

17. The memory device of claim 16, further comprising instructions configured to cause the computing device to perform the operations of:
translating the head movement, eye movement, or both into movement of the portion of the content of the display that is magnified by the magnification user interface.

* * * * *